United States Patent
Rosewarne

(10) Patent No.: US 11,405,640 B2
(45) Date of Patent: *Aug. 2, 2022

(54) METHOD, APPARATUS AND SYSTEM FOR ENCODING AND DECODING THE SIGNIFICANCE MAP FOR RESIDUAL COEFFICIENTS OF A TRANSFORM UNIT

(71) Applicant: CANON KABUSHIKI KAISHA, Tokyo (JP)

(72) Inventor: Christopher James Rosewarne, New South Wales (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/243,380

(22) Filed: Apr. 28, 2021

(65) Prior Publication Data
US 2021/0250611 A1 Aug. 12, 2021

Related U.S. Application Data

(63) Continuation of application No. 15/643,038, filed on Jul. 6, 2017, now Pat. No. 11,025,953, which is a (Continued)

(30) Foreign Application Priority Data

Jan. 20, 2012 (AU) ................. 2012200345

(51) Int. Cl.
*H04N 19/593* (2014.01)
*H04N 19/176* (2014.01)
(Continued)

(52) U.S. Cl.
CPC ........... *H04N 19/593* (2014.11); *H04N 19/11* (2014.11); *H04N 19/13* (2014.11); *H04N 19/176* (2014.11);
(Continued)

(58) Field of Classification Search
CPC ........ H04N 19/96; H04N 19/11; H04N 19/13; H04N 19/176; H04N 19/46; H04N 19/593;
(Continued)

(56) References Cited

U.S. PATENT DOCUMENTS

| | | | |
|---|---|---|---|
| 8,811,761 B2* | 8/2014 | Sasai ................ | H04N 19/44 382/238 |
| 9,088,796 B2* | 7/2015 | Misra ................ | H04N 19/91 |
| 2009/0074057 A1* | 3/2009 | Marpe ............... | H04N 19/13 375/240.02 |
| 2010/0086034 A1 | 4/2010 | Park et al. | |
| 2010/0238998 A1 | 9/2010 | Nanbu et al. | |

(Continued)

FOREIGN PATENT DOCUMENTS

CN 101500160 A 8/2009

*Primary Examiner* — Nathnael Aynalem
(74) *Attorney, Agent, or Firm* — Canon U.S.A., Inc. IP Division

(57) ABSTRACT

Disclosed is a method of decoding a plurality of coding units from a bitstream of video data. The method determines a coding unit structure of the plurality of coding units from a first data block of the bitstream. The coding unit structure describes a division of a coding unit into the plurality of coding units. The method decodes, according to the determined coding unit structure, bypass encoded data for the plurality of coding units from a second data block of the bitstream. The method decodes, according to the determined coding unit structure, residual data for the plurality of coding units from a third data block of the bitstream. The method then forms the plurality of coding units from the bitstream using the residual data and the bypass encoded data. A method of encoding is also disclosed.

14 Claims, 19 Drawing Sheets

Related U.S. Application Data continuation of application No. 14/373,005, filed as application No. PCT/AU2013/000036 on Jan. 18, 2013, now Pat. No. 9,736,495.

(51) Int. Cl.

| | |
|---|---|
| *H04N 19/46* | (2014.01) |
| *H04N 19/13* | (2014.01) |
| *H04N 19/11* | (2014.01) |
| *H04N 19/70* | (2014.01) |
| *H04N 19/91* | (2014.01) |
| *H04N 19/96* | (2014.01) |

(52) U.S. Cl.
CPC ............ *H04N 19/46* (2014.11); *H04N 19/70* (2014.11); *H04N 19/91* (2014.11); *H04N 19/96* (2014.11)

(58) Field of Classification Search
CPC ...... H04N 19/70; H04N 19/91; H04N 19/103; H04N 19/105; H04N 19/122; H04N 19/61; H04N 19/52; H04N 19/50
USPC ........................................ 375/240.01–240.29
See application file for complete search history.

(56) References Cited

U.S. PATENT DOCUMENTS

| | | | |
|---|---|---|---|
| 2011/0001643 A1* | 1/2011 | Sze .................. | H04N 19/91 341/87 |
| 2012/0014433 A1* | 1/2012 | Karczewicz ......... | H04N 19/13 375/240.02 |
| 2012/0177118 A1* | 7/2012 | Karczewicz ......... | H04N 19/463 375/240.13 |
| 2012/0300839 A1* | 11/2012 | Sze .................. | H04N 19/91 375/240.12 |
| 2012/0314766 A1* | 12/2012 | Chien ................ | H04N 19/11 375/240.12 |
| 2013/0003838 A1* | 1/2013 | Gao .................. | H04N 19/12 375/240.12 |
| 2013/0027230 A1* | 1/2013 | Marpe ............... | H04N 19/436 341/107 |
| 2013/0107951 A1* | 5/2013 | Sole Rojals ........ | H03M 7/4018 375/240.12 |
| 2013/0136175 A1* | 5/2013 | Wang ................ | H04N 19/11 375/240.12 |
| 2013/0136375 A1* | 5/2013 | Sasai ................ | H04N 19/136 382/238 |
| 2014/0192861 A1* | 7/2014 | Chuang ............. | H04N 19/21 375/240.02 |

* cited by examiner

METHOD, APPARATUS AND SYSTEM FOR ENCODING AND DECODING THE SIGNIFICANCE MAP FOR RESIDUAL COEFFICIENTS OF A TRANSFORM UNIT

CROSS-REFERENCE TO RELATED APPLICATIONS

This application is a continuation of U.S. patent application Ser. No. 15/643,038, filed on Jul. 6, 2017, which is a continuation of U.S. patent application Ser. No. 14/373,005, filed on Jul. 17, 2014, now U.S. Pat. No. 9,736,495, issued on Aug. 15, 2017, that is a National Phase application of PCT Application No. PCT/AU2013/000036, filed on Jan. 18, 2013 and titled "Method, apparatus and system for encoding and decoding the significance map for residual coefficients of a transform unit." This application claims the benefit under 35 U.S.C. § 119(a)-(d) of Australian Patent Application No. 2012200345, filed on Jan. 20, 2012. The above cited patent applications are incorporated herein by reference in their entirety.

TECHNICAL FIELD

The present invention relates generally to digital video signal processing and, in particular, to a method, apparatus and system for encoding and decoding residual coefficients of a transform unit (TU), wherein the transform unit (TU) may have a square shape or a non-square shape.

BACKGROUND

Many applications for video coding currently exist, including applications for transmission and storage of video data. Many video coding standards have also been developed and others are currently in development. Recent developments in video coding standardisation have led to the formation of a group called the "Joint Collaborative Team on Video Coding" (JCT-VC). The Joint Collaborative Team on Video Coding (JCT-VC) includes members of Study Group 16, Question 6 (SG16/Q6) of the Telecommunication Standardisation Sector (ITU-T) of the International Telecommunication Union (ITU), known as the Video Coding Experts Group (VCEG), and members of the International Organisations for Standardisation/International Electrotechnical Commission Joint Technical Committee 1/Subcommittee 29/Working Group 11 (ISO/IEC JTC1/SC29/WG11), also known as the Moving Picture Experts Group (MPEG).

The Joint Collaborative Team on Video Coding (JCT-VC) has the goal of producing a new video coding standard to significantly outperform a presently existing video coding standard, known as "H.264/MPEG-4 AVC". The H.264/MPEG-4 AVC standard is itself a large improvement on previous video coding standards, such as MPEG-4 and ITU-T H.263. The new video coding standard under development has been named "high efficiency video coding (HEVC)". The Joint Collaborative Team on Video Coding JCT-VC is also considering implementation challenges arising from technology proposed for high efficiency video coding (HEVC) that create difficulties when scaling implementations of the standard to operate at high resolutions or high frame rates.

One area of the H.264/MPEG-4 AVC video coding standard that presents difficulties for achieving high compression efficiency is the coding of residual coefficients used to represent video data. Video data is formed by a sequence of frames, with each frame having a two-dimensional array of samples. Typically, frames include one luminance and two chrominance channels. Each frame is decomposed into one or more slices. Each slice contains one or more largest coding units (LCUs). The largest coding units (LCUs) have a fixed size, with edge dimensions being a power of two and having equal width and height, such as 64 luma samples. One feature of the high efficiency video coding (HEVC) standard under development is "fine granularity slices". When the fine granularity slices feature is enabled, slice boundaries are not restricted to the largest coding unit (LCU) boundaries. Fine granularity slices may be enabled at a bitstream level.

A coding tree enables the subdivision of each largest coding unit (LCU) into four equally-sized regions, each having half the width and height of a parent largest coding unit (LCU). Each of the regions may be further subdivided into four equally-sized regions. Where a region is not further sub-divided, a coding unit exists, occupying the entirety of the region. Such a subdivision process may be applied recursively until the size of a region is a smallest coding unit (SCU) size is reached and a coding unit (CU) the size of the smallest coding unit (SCU) is inferred. The recursive subdivision of a largest coding unit into a hierarchy of coding units has a quadtree structure and is referred to as the coding tree. Coding units (CUs) or regions have a property known as their 'depth', which refers to their position in the coding tree in terms of the level in the hierarchy of subdivisions. This subdivision process is encoded in the bitstream as a sequence of arithmetically coded flags. When fine granularity slices is enabled, a threshold is specified which determines the smallest size of coding unit at which a slice boundary may exist.

A set of coding units exist in the coding tree that are not further sub-divided, being those coding units that occupy the leaf nodes of the coding tree. Transform trees exist at these coding units. A transform tree may further decompose a coding unit using a quadtree structure as used for the coding tree. At the leaf nodes of the transform tree, residual data is encoded using transform units (TUs). In contrast to the coding tree, the transform tree may subdivide coding units into transform units having a non-square shape. Further, the transform tree structure does not require that transform units (TUs) occupy all of the area provided by the parent coding unit.

Each coding unit at the leaf nodes of the coding trees are subdivided into one or more arrays of predicted data samples, each known as a prediction unit (PU). Each prediction unit (PU) contains a prediction of a portion of the input frame data, derived by applying an intra-prediction process or an inter-prediction process. Several methods may be used for coding prediction units (PUs) within a coding unit (CU). A single prediction unit (PU) may occupy an entire area of the coding unit (CU), or the coding unit (CU) may be split into two equal-sized rectangular prediction units (PUs), either horizontally or vertically. Additionally, the coding units (CU) may be split into four equal-sized square prediction units (PUs).

A video encoder compresses the video data into a bitstream by converting the video data into a sequence of syntax elements. A context adaptive binary arithmetic coding (CABAC) scheme is defined within the high efficiency video coding (HEVC) standard under development, using an identical arithmetic coding scheme as to that defined in the MPEG4-AVC/H.264 video compression standard. In the high efficiency video coding (HEVC) standard under development, when context adaptive binary arithmetic coding (CABAC) is in use, each syntax element is expressed as a sequence of bins, where the bins are selected from a set of available bins. The set of available bins is obtained from a context model, with one context per bin. Each context holds a likely bin value (the 'valMPS') and a probability state for the arithmetic encoding or arithmetic decoding operation. Note that bins may also be bypass coded, where there is no association with a context. Bypass coded bins consume one bit in the bitstream and therefore are suited to bins with equal probability of being one-valued or zero-valued. Creating such a sequence of bins from a syntax element is known as "binarising" the syntax elements.

In a video encoder or video decoder, as separate context information is available for each bin, context selection for bins provides a means to improve coding efficiency. In particular, coding efficiency may be improved by selecting a particular bin such that statistical properties from previous instances of the bin, where the associated context information was used, correlate with statistical properties of a current instance of the bin. Such context selection frequently utilises spatially local information to determine the optimal context.

In the high efficiency video coding (HEVC) standard under development and in H.264/MPEG-4 AVC, a prediction for a current block is derived, based on reference sample data either from other frames, or from neighbouring regions within the current block that have been previously decoded. The difference between the prediction and the desired sample data is known as the residual. A frequency domain representation of the residual is a two-dimensional array of residual coefficients. By convention, the upper-left corner of the two-dimensional array contains residual coefficients representing low-frequency information.

One aspect of throughput of the high efficiency video coding (HEVC) standard under development relates to the ability to encode or decode video data at high bit-rates. The context adaptive binary arithmetic coding (CABAC) scheme employed in the high efficiency video coding (HEVC) standard under development supports an 'equal probability' mode of operation referred to as 'bypass coding'. In this mode, the bin is not associated with a context from the context model, and so there is no context model update step. In this mode, it is possible to read multiple adjacent bins from the bitstream in parallel, provided each bin is bypass coded which increases throughput. For example, hardware implementations may write/read groups of adjacent bypass coded data in parallel to increase the throughput of encoding/decoding the bitstream.

SUMMARY

It is an object of the present invention to substantially overcome, or at least ameliorate, one or more disadvantages of existing arrangements.

According to one aspect of the present disclosure, there is provided a method of decoding a plurality of coding units from a bitstream of video data, the method comprising:

determining a coding unit structure of the plurality of coding units from a first data block of the bitstream, the coding unit structure describing a division of a coding unit into the plurality of coding units;

decoding, according to the determined coding unit structure, bypass encoded data for the plurality of coding units from a second data block of the bitstream;

decoding, according to the determined coding unit structure, residual data for the plurality of coding units from a third data block of the bitstream; and forming the plurality of coding units from the bitstream using the residual data and the bypass encoded data.

Desirably the method further comprises determining a size of the second data block according to the determined coding unit structure.

Preferably the method further comprises determining a split flag value such that when a current coding unit is larger than a smaller coding unit the split value flag is decoded from the bitstream and where the current coding unit is equal in size to the smallest coding unit, the split value fag is inferred to be zero. This implementation may further comprise using the determined split flag value to determine if the coding unit structure is at a leaf node.

In another implementation the bitstream encodes a fine granularity slice enable flag at the start of each largest coding unit, such that when the fine granularity slices are not enabled for a largest coding unit, the method is applied to that largest coding unit (LCU), and when the fine granularity slices are enabled for a largest coding unit, the method is applied to each subdivided coding unit equal in size to the fine granularity slice threshold.

Preferably a remaining mode of a coding unit of the plurality of coding units is coded using a variable length code, said method further comprises calculating a minimum length based on a most probable mode flag value and a prediction unit size associated with the coding unit.

Desirably remaining modes of the plurality of coding units are coded using a variable length code, said method further comprises calculating a minimum length based on the coding unit structure, most probable mode flag values and prediction unit sizes associated with the plurality of coding units.

Advantageously, when the bypass coded data is of unknown length, the method further comprises accessing the bitstream to determine a segment of data containing at least some bypass coded data, decoding most probable mode indices and remaining modes from the segment of data, and establishing a running total a length of the decoded data, such that when all bypass encoded data is decoded from the segment of data, the running total length is then consumed from the bitstream.

According to another aspect of the present disclosure, there is provided a method of encoding a plurality of coding units into a bitstream of video data, the method comprising:

encoding a coding unit structure of the plurality of coding units to form a first data block of the bitstream, the coding unit structure describing a division of a coding unit into the plurality of coding units;

encoding, according to the coding unit structure, bypass encoded data for the plurality of coding units to form a second data block of the bitstream; and encoding, according to the coding unit structure, residual data for the plurality of coding units to form a third data block of the bitstream; and storing the first, second and third data blocks to encode the plurality of coding units into the bitstream of video data.

Desirably, this method further comprises storing split flags in the first data block to encode the coding unit structure.

Preferably the method further comprise arithmetically encoding the first block.

Advantageously the method further comprises bypass encoding the second block.

According to another aspect there is disclosed a method of decoding at least one coding unit from a bitstream of video data, the method comprising:

determining a coding unit structure of the at least one coding unit from the bitstream, the coding unit structure describing a division of a coding unit into the at least one coding unit and a division of the at least one coding unit into a plurality of prediction units;

decoding, according to the determined coding unit structure, an arithmetically encoded most probable mode flag for each of the plurality of prediction units in the at least one coding unit from a first block of adjacently coded data in the bitstream;

decoding, according to the determined coding unit structure, bypass encoded data for each of the plurality of prediction units in the at least one coding unit from a second data block of adjacently coded data in the bitstream;

determining intra-prediction modes for each of the plurality of prediction units according to each of the most probable mode flags and the bypass encoded data; and decoding the at least one coding unit from the bitstream using the determined intra-prediction modes.

Preferably the bypass coded data contains a most probable mode index. The bypass coded data may alternatively or additionally contain a remaining mode value.

Other aspects are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Figure 1:
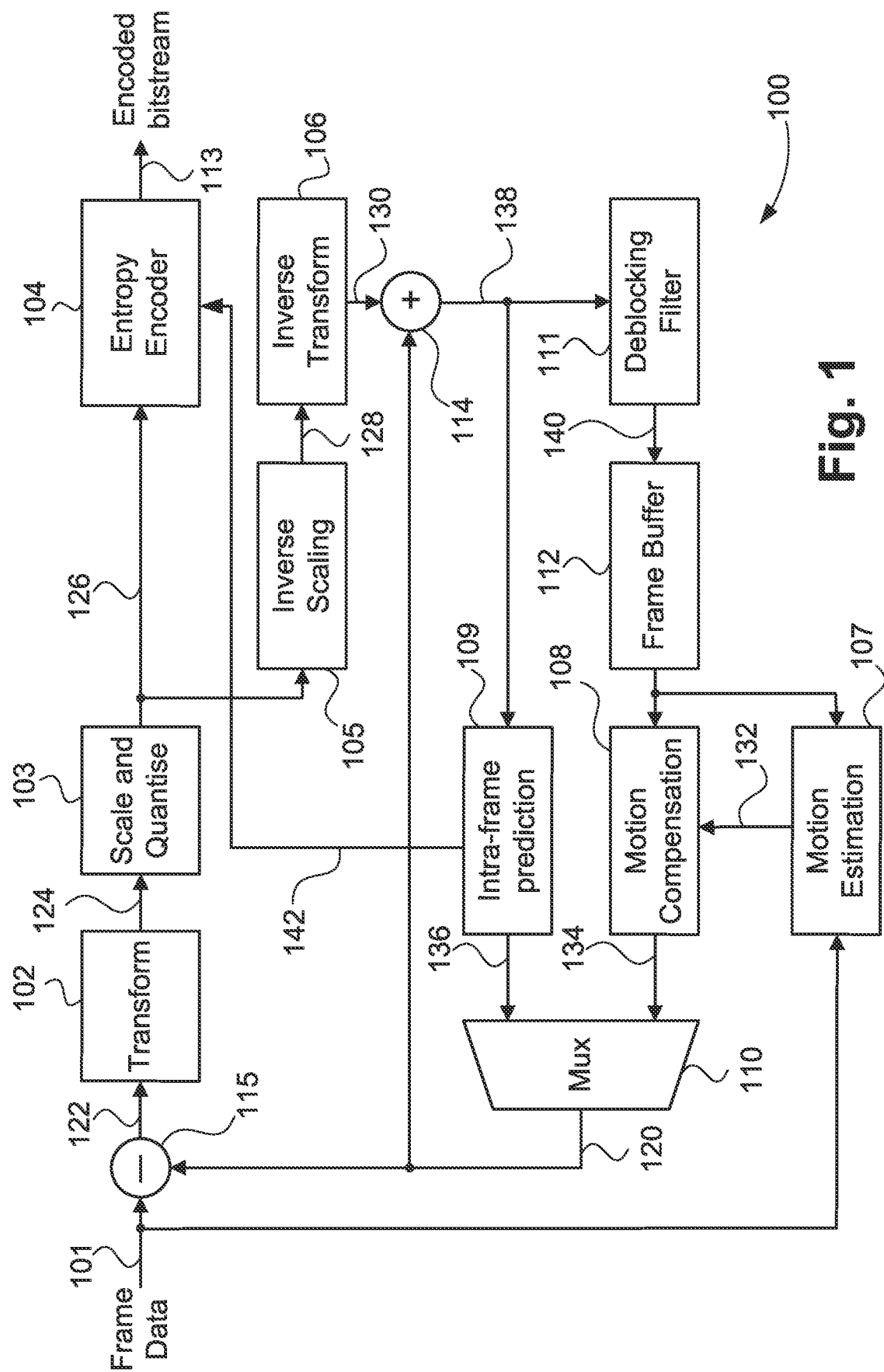
FIG. 1 is a schematic block diagram showing functional modules of a video encoder.

Where reference is made in any one or more of the accompanying drawings to steps and/or features, which have the same reference numerals, those steps and/or features have for the purposes of this description the same function(s) or operation(s), unless the contrary intention appears.

Figure 2:
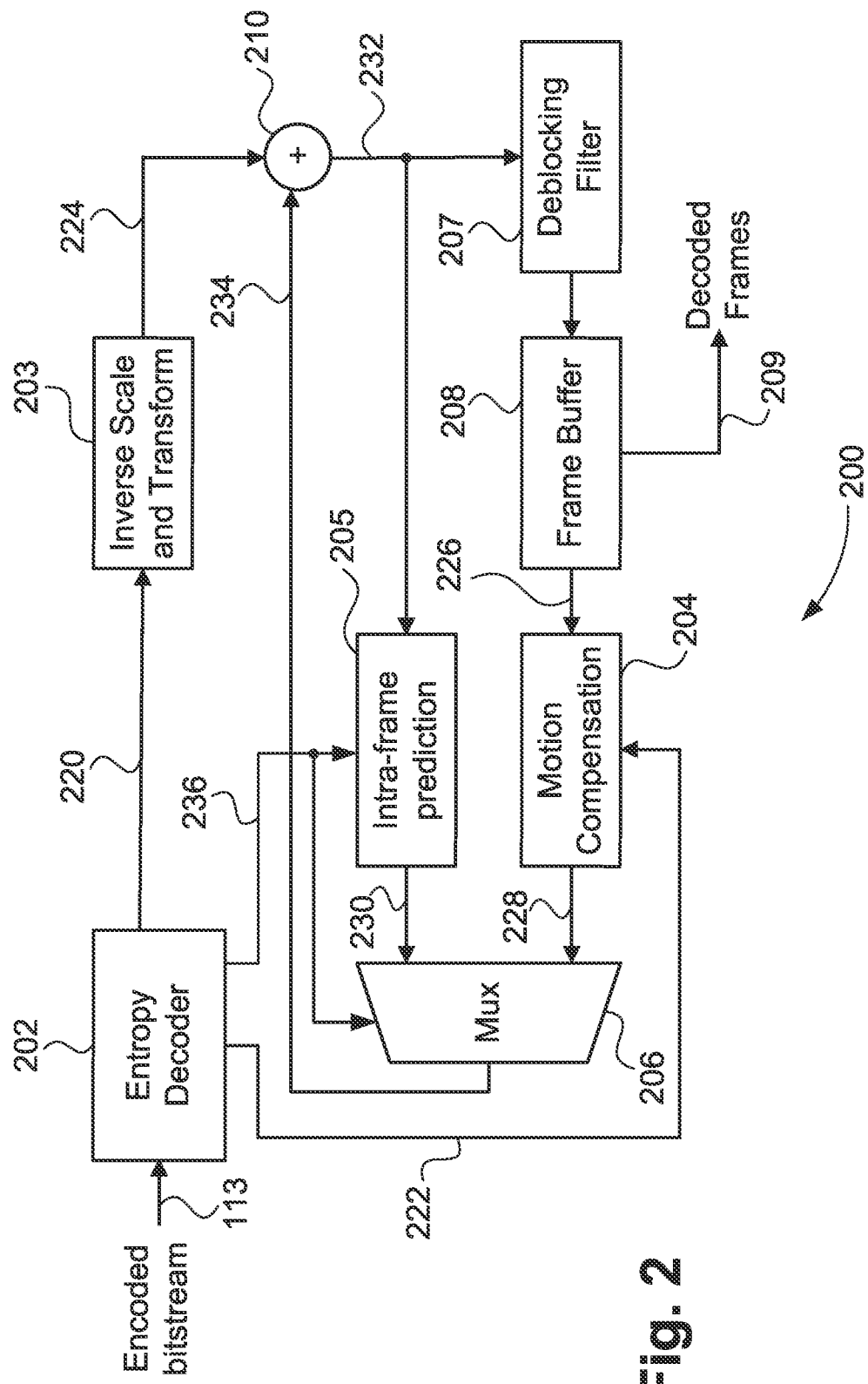
FIG. 2 is a schematic block diagram showing functional modules of a video decoder.

FIG. 1 is a schematic block diagram showing functional modules of a video encoder 100. FIG. 2 is a schematic block diagram showing functional modules of a corresponding video decoder 200. The video encoder 100 and video decoder 200 may be implemented using a general-purpose computer system 300, as shown in FIGS. 3A and 3B where the various functional modules may be implemented by dedicated hardware within the computer system 300, by software executable within the computer system 300, or alternatively by a combination of dedicated hardware and software executable within the computer system 300.

Figure 3A:
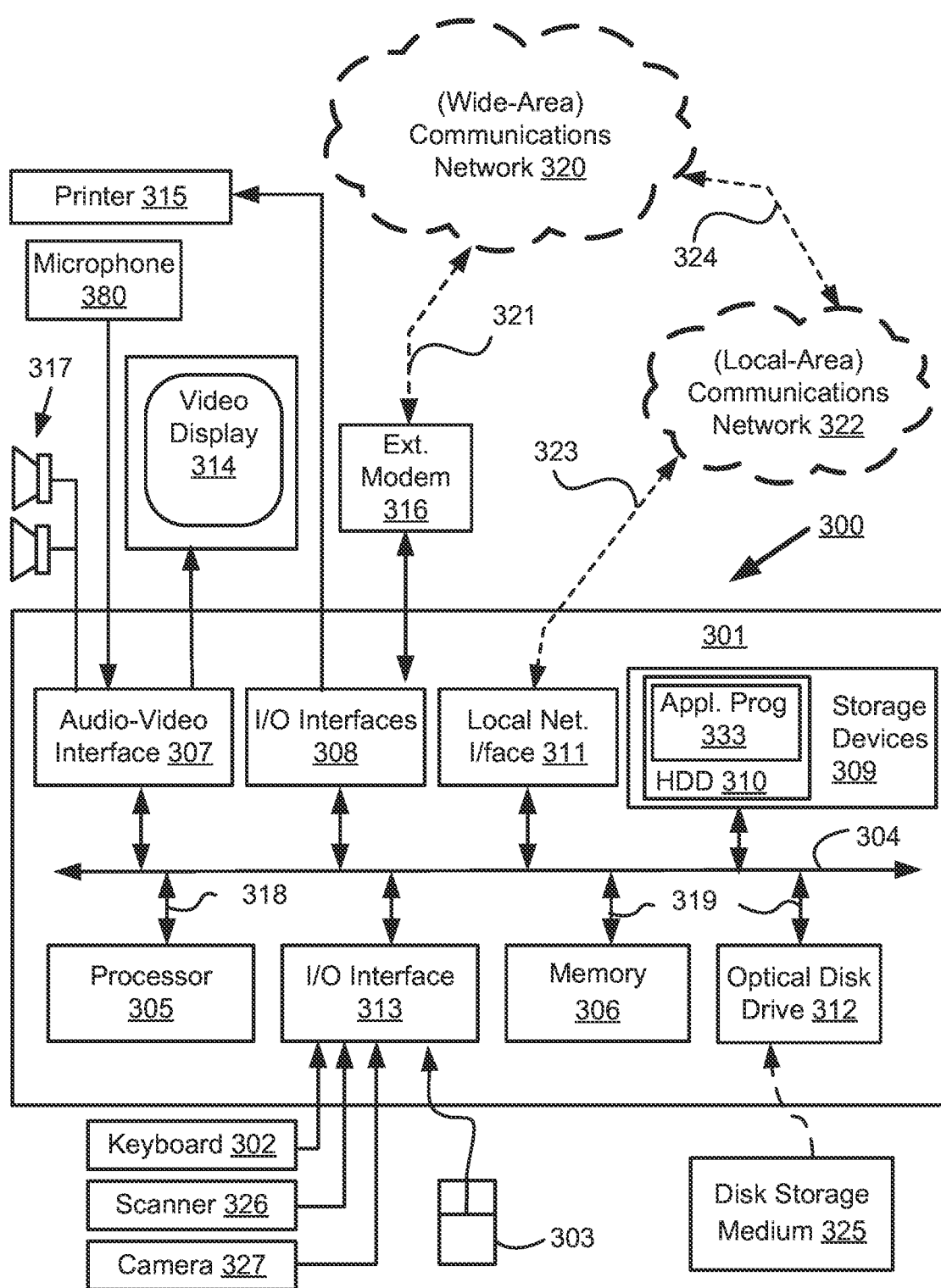
FIGS. 3A and 3B form a schematic block diagram of a general purpose computer system upon which the encoder and decoder of FIGS. 1 and 2, respectively, may be practiced.
Figure 3B:
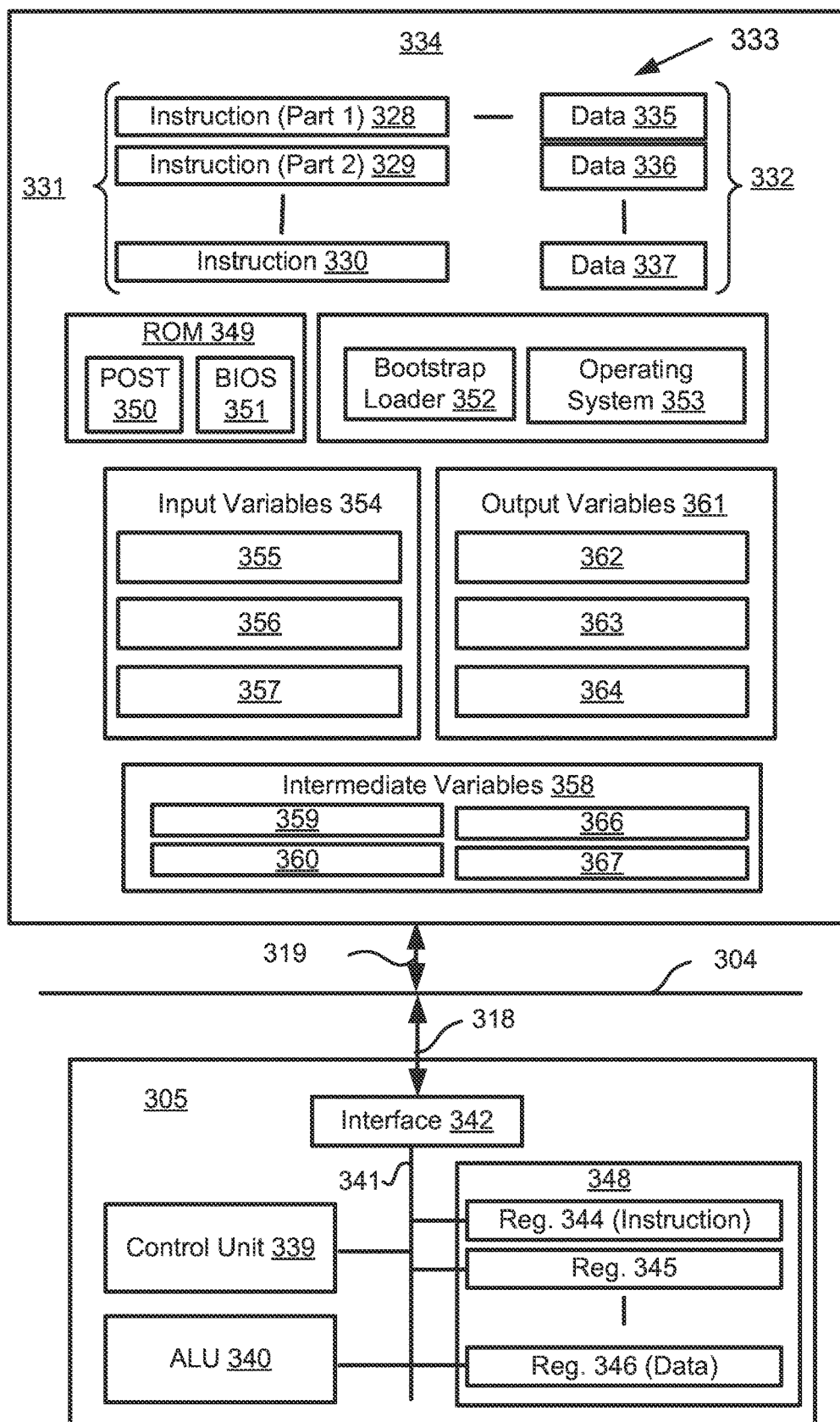

As seen in FIG. 3A, the computer system 300 includes: a computer module 301; input devices such as a keyboard 302, a mouse pointer device 303, a scanner 326, a camera 327, and a microphone 380; and output devices including a printer 315, a display device 314 and loudspeakers 317. An external Modulator-Demodulator (Modem) transceiver device 316 may be used by the computer module 301 for communicating to and from a communications network 320 via a connection 321. The communications network 320 may be a wide-area network (WAN), such as the Internet, a cellular telecommunications network, or a private WAN. Where the connection 321 is a telephone line, the modem 316 may be a traditional "dial-up" modem. Alternatively, where the connection 321 is a high capacity (e.g., cable) connection, the modem 316 may be a broadband modem. A wireless modem may also be used for wireless connection to the communications network 320.

The computer module 301 typically includes at least one processor unit 305, and a memory unit 306. For example, the memory unit 306 may have semiconductor random access memory (RAM) and semiconductor read only memory (ROM). The computer module 301 also includes an number of input/output (I/O) interfaces including: an audio-video interface 307 that couples to the video display 314, loudspeakers 317 and microphone 380; an I/O interface 313 that couples to the keyboard 302, mouse 303, scanner 326, camera 327 and optionally a joystick or other human interface device (not illustrated); and an interface 308 for the external modem 316 and printer 315. In some implementations, the modem 316 may be incorporated within the computer module 301, for example within the interface 308. The computer module 301 also has a local network interface 311, which permits coupling of the computer system 300 via a connection 323 to a local-area communications network 322, known as a Local Area Network (LAN). As illustrated in FIG. 3A, the local communications network 322 may also couple to the wide network 320 via a connection 324, which would typically include a so-called "firewall" device or device of similar functionality. The local network interface 311 may comprise an Ethernet™ circuit card, a Bluetooth™ wireless arrangement or an IEEE 802.11 wireless arrangement; however, numerous other types of interfaces may be practised for the interface 311.

The I/O interfaces 308 and 313 may afford either or both of serial and parallel connectivity, the former typically being implemented according to the Universal Serial Bus (USB) standards and having corresponding USB connectors (not illustrated). Storage devices 309 are provided and typically include a hard disk drive (HDD) 310. Other storage devices such as a floppy disk drive and a magnetic tape drive (not illustrated) may also be used. An optical disk drive 312 is typically provided to act as a non-volatile source of data. Portable memory devices, such optical disks (e.g. CD-ROM, DVD, Blu-ray Disc™), USB-RAM, portable, external hard drives, and floppy disks, for example, may be used as appropriate sources of data to the system 300. Typically, any of the HDD 310, optical drive 312, networks 320 and 322, or camera 327 may for a source for video data to be encoded, or, with the display 314, a destination for decoded video data to be stored or reproduced.

Figure 10:
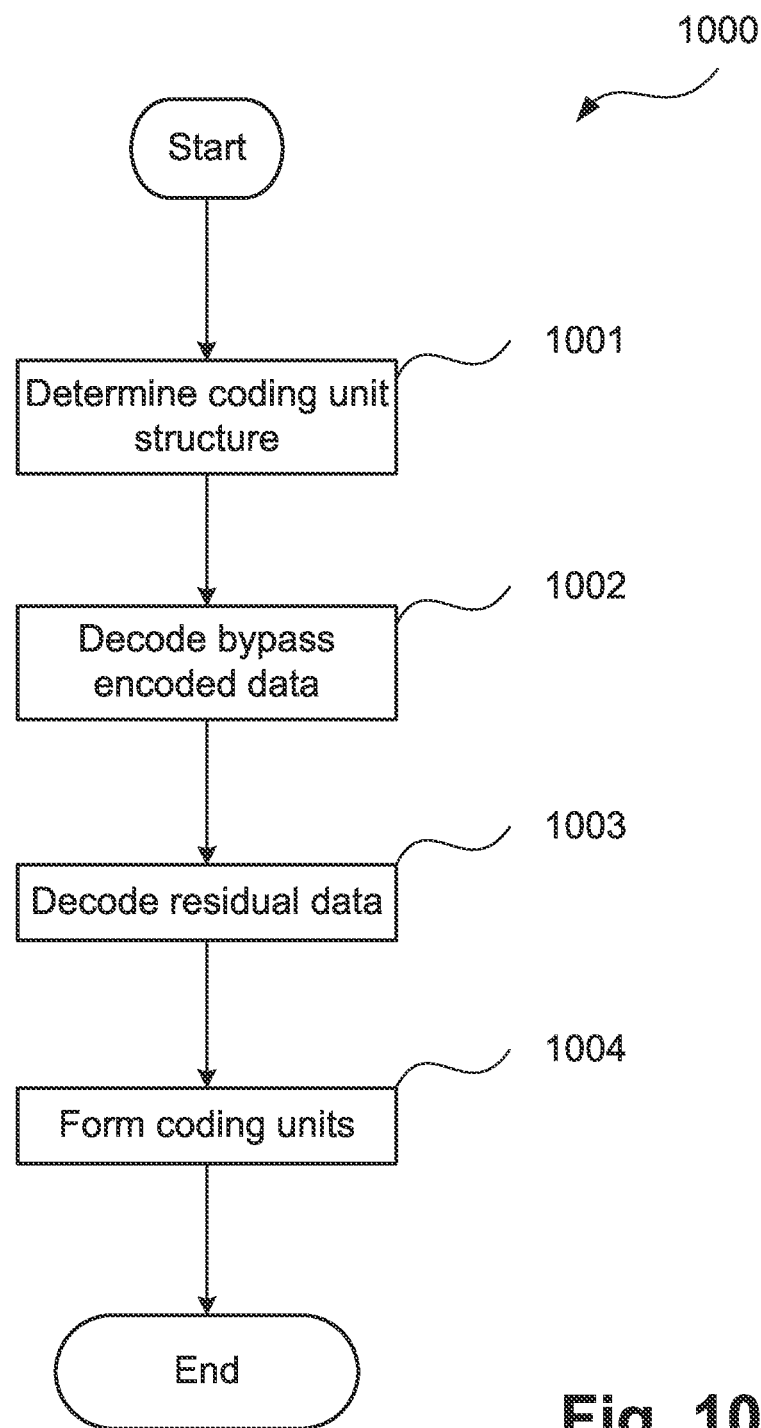
FIG. 10 is a schematic flow diagram showing a summarised method according to the present disclosure for decoding the syntax elements of a largest coding unit (LCU) of a bitstream.
Figure 11:
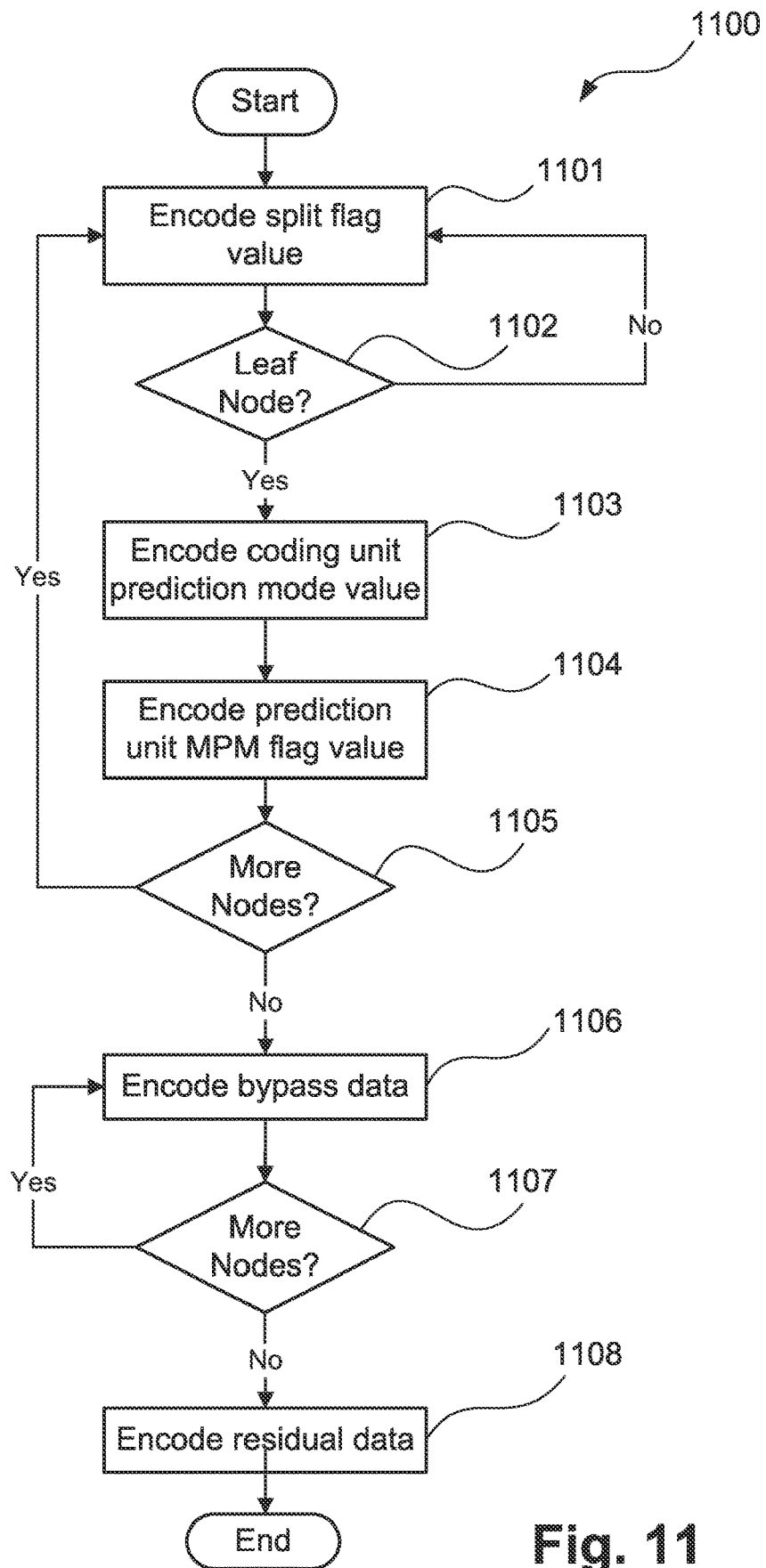
FIG. 11 is a schematic flow diagram showing a method according to the present disclosure for encoding the syntax elements of a largest coding unit (LCU)

The components 305 to 313 of the computer module 301 typically communicate via an interconnected bus 304 and in a manner that results in a conventional mode of operation of the computer system 300 known to those in the relevant art. For example, the processor 305 is coupled to the system bus 304 using a connection 318. Likewise, the memory 306 and optical disk drive 312 are coupled to the system bus 304 by connections 319. Examples of computers on which the described arrangements can be practised include IBM-PC's and compatibles, Sun Sparcstations, Apple Mac™ or alike computer systems.

Where appropriate or desired, the encoder 100 and the decoder 200, as well as methods described below, may be implemented using the computer system 300 wherein the encoder 100, the decoder 200 and the processes of FIGS. 10 and 11, to be described, may be implemented as one or more software application programs 333 executable within the computer system 300. In particular, the encoder 100, the decoder 200 and the steps of the described methods are effected by instructions 331 (see FIG. 3B) in the software 333 that are carried out within the computer system 300. The software instructions 331 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 300 from the computer readable medium, and then executed by the computer system 300. A computer readable medium having such software or computer program recorded on the computer readable medium is a computer program product. The use of the computer program product in the computer system 300 preferably effects an advantageous apparatus for implementing the encoder 100, the decoder 200 and the described methods.

The software 333 is typically stored in the HDD 310 or the memory 306. The software is loaded into the computer system 300 from a computer readable medium, and executed by the computer system 300. Thus, for example, the software 333 may be stored on an optically readable disk storage medium (e.g., CD-ROM) 325 that is read by the optical disk drive 312.

In some instances, the application programs 333 may be supplied to the user encoded on one or more CD-ROMs 325 and read via the corresponding drive 312, or alternatively may be read by the user from the networks 320 or 322. Still further, the software can also be loaded into the computer system 300 from other computer readable media. Computer readable storage media refers to any non-transitory tangible storage medium that provides recorded instructions and/or data to the computer system 300 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 301. Examples of transitory or non-tangible computer readable transmission media that may also participate in the provision of the software, application programs, instructions and/or video data or encoded video data to the computer module 301 include radio or infra-red transmission channels as well as a network connection to another computer or networked device, and the Internet or Intranets including e-mail transmissions and information recorded on Websites and the like.

The second part of the application programs 333 and the corresponding code modules mentioned above may be executed to implement one or more graphical user interfaces (GUIs) to be rendered or otherwise represented upon the display 314. Through manipulation of typically the keyboard 302 and the mouse 303, a user of the computer system 300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 317 and user voice commands input via the microphone 380.

FIG. 3B is a detailed schematic block diagram of the processor 305 and a "memory" 334. The memory 334 represents a logical aggregation of all the memory modules (including the HDD 309 and semiconductor memory 306) that can be accessed by the computer module 301 in FIG. 3A.

When the computer module 301 is initially powered up, a power-on self-test (POST) program 350 executes. The POST program 350 is typically stored in a ROM 349 of the semiconductor memory 306 of FIG. 3A. A hardware device such as the ROM 349 storing software is sometimes referred to as firmware. The POST program 350 examines hardware within the computer module 301 to ensure proper functioning and typically checks the processor 305, the memory 334 (309, 306), and a basic input-output systems software (BIOS)module 351, also typically stored in the ROM 349, for correct operation. Once the POST program 350 has run successfully, the BIOS 351 activates the hard disk drive 310 of FIG. 3A. Activation of the hard disk drive 310 causes a bootstrap loader program 352 that is resident on the hard disk drive 310 to execute via the processor 305. This loads an operating system 353 into the RAM memory 306, upon which the operating system 353 commences operation. The operating system 353 is a system level application, executable by the processor 305, to fulfil various high level functions, including processor management, memory management, device management, storage management, software application interface, and generic user interface.

The operating system 353 manages the memory 334 (309, 306) to ensure that each process or application running on the computer module 301 has sufficient memory in which to execute without colliding with memory allocated to another process. Furthermore, the different types of memory available in the system 300 of FIG. 3A must be used properly so that each process can run effectively. Accordingly, the aggregated memory 334 is not intended to illustrate how particular segments of memory are allocated (unless otherwise stated), but rather to provide a general view of the memory accessible by the computer system 300 and how such is used.

As shown in FIG. 3B, the processor 305 includes a number of functional modules including a control unit 339, an arithmetic logic unit (ALU) 340, and a local or internal memory 348, sometimes called a cache memory. The cache memory 348 typically includes a number of storage registers 344-346 in a register section. One or more internal busses 341 functionally interconnect these functional modules. The processor 305 typically also has one or more interfaces 342 for communicating with external devices via the system bus 304, using a connection 318. The memory 334 is coupled to the bus 304 using a connection 319.

The application program 333 includes a sequence of instructions 331 that may include conditional branch and loop instructions. The program 333 may also include data 332 which is used in execution of the program 333. The instructions 331 and the data 332 are stored in memory locations 328, 329, 330 and 335, 336, 337, respectively. Depending upon the relative size of the instructions 331 and the memory locations 328-330, a particular instruction may be stored in a single memory location as depicted by the instruction shown in the memory location 330. Alternately, an instruction may be segmented into a number of parts each of which is stored in a separate memory location, as depicted by the instruction segments shown in the memory locations 328 and 329.

In general, the processor 305 is given a set of instructions which are executed therein. The processor 305 waits for a subsequent input, to which the processor 305 reacts to by executing another set of instructions. Each input may be provided from one or more of a number of sources, including data generated by one or more of the input devices 302, 303, data received from an external source across one of the networks 320, 302, data retrieved from one of the storage devices 306, 309 or data retrieved from a storage medium 325 inserted into the corresponding reader 312, all depicted in FIG. 3A. The execution of a set of the instructions may in some cases result in output of data. Execution may also involve storing data or variables to the memory 334.

The encoder 100, the decoder 200 and the described methods use input variables 354, which are stored in the memory 334 in corresponding memory locations 355, 356, 357. The encoder 100, the decoder 200 and the described methods produce output variables 361, which are stored in the memory 334 in corresponding memory locations 362, 363, 364. Intermediate variables 358 may be stored in memory locations 359, 360, 366 and 367.

Referring to the processor 305 of FIG. 3B, the registers 344, 345, 346, the arithmetic logic unit (ALU) 340, and the control unit 339 work together to perform sequences of micro-operations needed to perform "fetch, decode, and execute" cycles for every instruction in the instruction set making up the program 333. Each fetch, decode, and execute cycle comprises:

(a) a fetch operation, which fetches or reads an instruction 331 from a memory location 328, 329, 330;

(b) a decode operation in which the control unit 339 determines which instruction has been fetched; and (c) an execute operation in which the control unit 339 and/or the ALU 340 execute the instruction.

Thereafter, a further fetch, decode, and execute cycle for the next instruction may be executed. Similarly, a store cycle may be performed by which the control unit 339 stores or writes a value to a memory location 332.

Each step or sub-process in the processes of FIGS. 1 to 17 to be described is associated with one or more segments of the program 333 and is typically performed by the register section 344, 345, 347, the ALU 340, and the control unit 339 in the processor 305 working together to perform the fetch, decode, and execute cycles for every instruction in the instruction set for the noted segments of the program 333.

The encoder 100, the decoder 200 and the described methods may alternatively be implemented in dedicated hardware such as one or more integrated circuits performing the functions or sub functions of the described methods. Such dedicated hardware may include graphic processors, digital signal processors, application specific integrated circuits (ASICs), field programmable gate arrays (FPGAs) or one or more microprocessors and associated memories. The net effect of the systems described is computerised apparatus configured to process coding units associated with a bitstream of video data.

As described above, the video encoder 100 may be implemented as one or more software code modules of the software application program 333 resident on the hard disk drive 305 and being controlled in its execution by the processor 305. In particular the video encoder 100 comprises modules 102 to 112, 114 and 115 which may each be implemented as one or more software code modules of the software application program 333.

Although the video encoder 100 of FIG. 1 is an example of a high efficiency video coding (HEVC) video decoding pipeline, processing stages performed by the modules 102 to 112, 114 and 115 are common to other video codecs such as VC-1 or H.264/MPEG-4 AVC. The video encoder 100 receives unencoded frame data 101 as a series of frames including luminance and chrominance samples. The video encoder 100 divides each frame of the frame data 101 into hierarchical sets of coding units (CUs), representable for example as a coding unit (CU) tree.

The video encoder 100 operates by outputting, from a multiplexer module 110, an array of predicted data samples known as a prediction unit (PU) 120. A difference module 115 outputs the difference between the prediction unit (PU) 120 and a corresponding array of data samples received from the frame data 101, the difference being known as residual data samples 122.

The residual data samples 122 from the difference module 115 are received by a transform module 102, which converts the difference from a spatial representation to a frequency domain representation to create transform coefficients 124 for each transform unit (TU) in the transform tree. For the high efficiency video coding (HEVC) standard under development, the conversion to the frequency domain representation is implemented using a modified discrete cosine transform (DCT), in which a traditional DCT is modified to be implemented using shifts and additions. The transform coefficients 124 are then input to a scale and quantise module 103 and are scaled and quantised to produce residual coefficients 126. The scale and quantisation process results in a loss of precision. The residual coefficients 126 are taken as input to an inverse scaling module 105 which reverses the scaling performed by the scale and quantise module 103 to produce rescaled transform coefficients 128, which are rescaled versions of the residual coefficients 126. The residual coefficients 126 are also taken as input to an entropy encoder module 104 which encodes the residual coefficients in an encoded bitstream 113. Due to the loss of precision resulting from the scale and quantise module 103, the rescaled transform coefficients 128 are not identical to the original transform coefficients 124. The rescaled transform coefficients 128 from the inverse scaling module 105 are then output to an inverse transform module 106. The inverse transform module 106 performs an inverse transform from the frequency domain to the spatial domain to produce a spatial-domain representation 130 of the rescaled transform coefficients 128 identical to a spatial domain representation that is produced at a decoder.

A motion estimation module 107 produces motion vectors 132 by comparing the frame data 101 with previous frame data stored in a frame buffer module 112 configured within the memory 306. The motion vectors 132 are then input to a motion compensation module 108 which produces inter-predicted reference samples 134 by filtering samples stored in the frame buffer module 112, taking into account a spatial offset derived from the motion vectors 132. Not illustrated in FIG. 1, the motion vectors 132 are also passed as syntax elements to the entropy encoder module 104 for coding in the encoded bitstream 113. An intra-frame prediction module 109 produces intra-predicted reference samples 136 using samples 138 obtained from a summation module 114, which sums the output 120 of the multiplexer module 110 and the output 130 from the inverse transform module 106.

Prediction units (PUs) may be coded using intra-prediction or inter-prediction methods. The decision as to whether to use intra-prediction or inter-prediction is made according to a rate-distortion trade-off between desired bit-rate of the resulting encoded bitstream 113 and the amount of image quality distortion introduced by either the intra-prediction or inter-prediction method. If intra-prediction is used, one intra-prediction mode is selected from a set of possible modes, also according to a rate-distortion trade-off. One intra-prediction mode is selected for each prediction unit. The high efficiency video coding (HEVC) test model 5.0 (HM-5.0) supports 35 intra-prediction modes, however not all intra-prediction modes can be used for all prediction unit sizes. For example, an 8×8 prediction unit may have 35 intra-prediction modes available for selection and a 4×4 prediction unit may have 18 intra-prediction modes available for selection in some implementations and 19 modes available for selection in other implementations. The multiplexer module 110 selects either the intra-predicted reference samples 136 from the intra-frame prediction module 109 or the inter-predicted reference samples 134 from the motion compensation block 108, depending on a current prediction mode 142, determined by control logic not illustrated but well-known in the art. The prediction mode 142 is also provided to the entropy encoder 104 and as such is used to determine or otherwise establish the scan order of transform units as will be described. Inter-frame prediction uses only a diagonal scan order, whereas intra-frame prediction may use the diagonal scan, a horizontal scan or a vertical scan order.

The summation module 114 produces a sum 138 that is input to a deblocking filter module 111. The deblocking filter module 111 performs filtering along block boundaries, producing deblocked samples 140 that are written to the frame buffer module 112 configured within the memory 306. The frame buffer module 112 is a buffer with sufficient capacity to hold data from multiple past frames for future reference.

In the video encoder 100, the residual data samples 122 within one transform unit (TU) are determined by finding the difference between data samples of the input frame data 101 and the prediction 120 of the data samples of the input frame data 101. The difference provides a spatial representation of the residual coefficients of the transform unit (TU).

The residual coefficients of a transform unit (TU) are converted to the two-dimensional significance map.

The significance map of the residual coefficients in the transform unit (TU) is then scanned in a particular order, known as a scan order, to form a one-dimensional list of flag values, called a list of significant coefficient flags. The scan order may be described or otherwise specified by a scan pattern, such as that received with the prediction mode 142 from the intra-prediction module 109. The scan pattern may be horizontal, vertical, diagonal or zig-zag. Version 5 of the high efficiency video coding (HEVC) test model perform scanning in a backward direction, however scanning in a forward direction is also possible. For 16×16, 32×32, 4×16, 16×4, 8×32 and 32×8 transform units (TUs), a two-level scan is defined where the transform unit (TU) is divided into a set of sub-blocks, each sub-block having a square shape. At an upper level, scanning is performed by scanning each lower-level using a scan such as the backward diagonal down-left scan. At the lower level, also known as the sub-block level, scanning also is performed using a scan such as the backward diagonal down-left scan. In HEVC reference model version 5.0, the scan operation starts one residual coefficient after a last significant coefficient (where 'after' is in the direction of a backward scan of the residual coefficients) and progresses until an upper-left location of the significance map is reached. Scan operations having this property and which accord to the HEVC reference model version 5.0 are known as 'backward scans'. In the HEVC reference software version 5.0, the location of the last significant coefficient is signalled by encoding co-ordinates of the coefficient in the transform unit (TU). Those familiar with the art will appreciate that the use of the adjective "last" in this context is dependent upon the particular order of scanning. What may be the "last" non-zero residual coefficient or corresponding one-valued significant coefficient flag according to one scan pattern may not be the "last" according to another scan pattern. The list of significant coefficient flags, indicating the significance of each residual coefficient prior to the last significant coefficient, is coded into the bitstream. The last significant coefficient flag value is not required to be explicitly encoded into the bitstream because the prior coding of the location of the last significant coefficient flag implicitly indicated that this residual coefficient was significant.

The clustering of larger-valued residual coefficients towards the upper-left of the transform unit (TU) results in most significance flags earlier in the list being significant, whereas few significance flags are found later in the list.

As described above, the video encoder 100 also comprises an entropy encoder module 104 that implements an entropy encoding method. The entropy encoder module 104 produces syntax elements from incoming residual coefficient data (or residual coefficients) 126 received from the scale and quantise module 103. The entropy encoder module 104 outputs encoded bitstream 113 and will be described in more detail below. For the high efficiency video coding (HEVC) standard under development, the encoded bitstream 113 is delineated into network abstraction layer (NAL) units. Each slice of a frame is contained in one NAL unit.

There are several alternatives for the entropy encoding method implemented in the entropy encoder module 104. The high efficiency video coding (HEVC) standard under development supports context adaptive binary arithmetic coding (CABAC), a variant of context adaptive binary arithmetic coding (CABAC) found in H.264/MPEG-4 AVC. An alternative entropy coding scheme is the probability interval partitioning entropy (PIPE) coder, which is well-known in the art.

For a video encoder 100 supporting multiple video coding methods, one of the supported entropy coding methods is selected according to the configuration of the encoder 100. Further, in encoding the coding units from each frame, the entropy encoder module 104 writes the encoded bitstream 113 such that each frame has one or more slices per frame, with each slice containing image data for part of the frame. Producing one slice per frame reduces overhead associated with delineating each slice boundary. However, dividing the frame into multiple slices is also possible.

The video decoder 200 of FIG. 2 may be implemented as one or more software code modules of the software application program 333 resident on the hard disk drive 305 and being controlled in its execution by the processor 305. In particular the video decoder 200 comprises modules 202 to 208 and 210 which may each be implemented as one or more software code modules of the software application program 333. Although the video decoder 200 is described with reference to a high efficiency video coding (HEVC) video decoding pipeline, processing stages performed by the modules 202 to 208 and 209 are common to other video codecs that employ entropy coding, such as H.264/MPEG-4 AVC, MPEG-2 and VC-1.

An encoded bitstream, such as the encoded bitstream 113, is received by the video decoder 200. The encoded bitstream 113 may be read from memory 306, the hard disk drive 310, a CD-ROM, a Blu-ray™ disk or other computer readable storage medium. Alternatively the encoded bitstream 113 may be received from an external source such as a server connected to the communications network 320 or a radio-frequency receiver. The encoded bitstream 113 contains encoded syntax elements representing frame data to be decoded.

The encoded bitstream 113 is input to an entropy decoder module 202 which extracts the syntax elements from the encoded bitstream 113 and passes the values of the syntax elements to other blocks in the video decoder 200. There may be multiple entropy decoding methods implemented in the entropy decoder module 202, such as those described with reference to the entropy encoder module 104. Syntax element data 220 representing residual coefficient data is passed to an inverse scale and transform module 203 and syntax element data 222 representing motion vector information is passed to a motion compensation module 204. The inverse scale and transform module 203 performs inverse scaling on the residual coefficient data to create reconstructed transform coefficients. The module 203 then performs an inverse transform to convert the reconstructed transform coefficients from a frequency domain representation to a spatial domain representation, producing residual samples 224, such as the inverse transform described with reference to the inverse transform module 106.

The motion compensation module 204 uses the motion vector data 222 from entropy decoder module 202, combined with previous frame data 226 from a frame buffer block 208, configured within the memory 306, to produce inter-predicted reference samples 228 for a prediction unit (PU), being a prediction of output decoded frame data. When a syntax element indicates that the current coding unit was coded using intra-prediction, the intra-frame prediction module 205 produces intra-predicted reference samples 230 for the prediction unit (PU) using samples spatially neighbouring the prediction unit (PU). The spatially neighbouring samples are obtained from a sum 232 output from a summation module 210. The multiplexer module 206 selects intra-predicted reference samples or inter-predicted reference samples for the prediction unit (PU) depending on the current prediction mode, which is indicated by a syntax element in the encoded bitstream 113. The array of samples 234 output from the multiplexer module 206 is added to the residual samples 224 from the inverse scale and transform module 203 by the summation module 210 to produce the sum 232 which is then input to each of a deblocking filter module 207 and the intra-frame prediction module 205. In contrast to the encoder 100, the intra-frame prediction module 205 receives a prediction mode 236 from the entropy decoder 202. The multiplexer 206 receives an intra-frame prediction/inter-frame prediction selection signal from the entropy decoder 202. The deblocking filter module 207 performs filtering along data block boundaries to smooth artefacts visible along the data block boundaries. The output of the deblocking filter module 207 is written to the frame buffer module 208 configured within the memory 306. The frame buffer module 208 provides sufficient storage to hold multiple decoded frames for future reference. Decoded frames 209 are also output from the frame buffer module 208.

Figure 4:
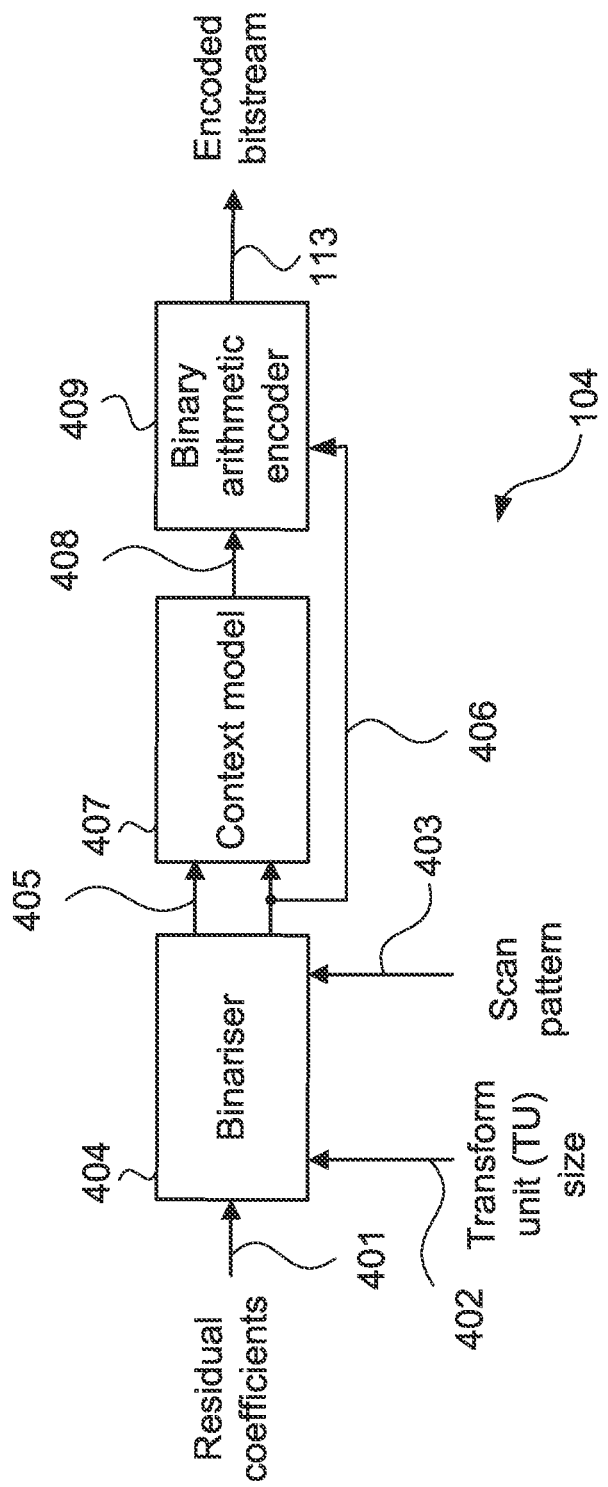
FIG. 4 is a schematic block diagram showing functional modules of an entropy encoder.

The entropy encoder 104 will be described with reference to FIG. 4. Syntax elements, such as residual coefficients 401, are input to a binariser module 404. A transform unit (TU) size 402 is input to the binariser module 404. The transform unit (TU) size, indicating the size of the transform unit (TU) being encoded. A scan pattern 403 is input to the binariser module 404. The binariser module 404 binarises each syntax element into a sequence of bins. Each bin comprises a bin value 406 and a context index 405. The bin value 406 and the context index 405 are received by a context model 407, which outputs a context 408, selected according to the context index 405. The context 408 is updated in accordance with the bin value 405. The method for updating the context 408 accords with that used by the context adaptive binary arithmetic coding (CABAC) in H.264/MPEG-4 AVC. A binary arithmetic encoder 409 uses the context 408 and the bin value 406 to encode the bin into the encoded bitstream 113.

Figure 5:
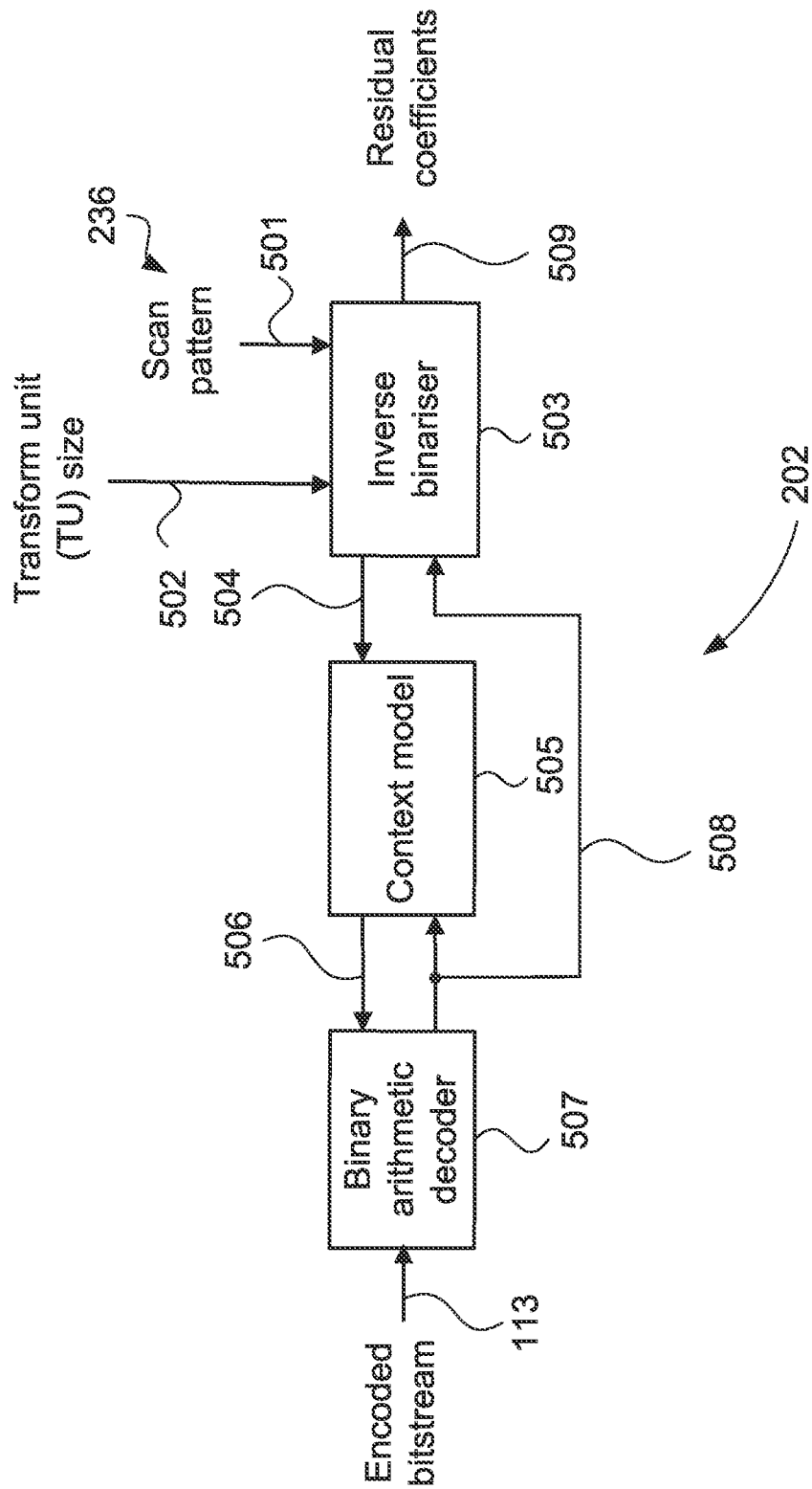
FIG. 5 is a schematic block diagram showing functional modules of an entropy decoder.

The entropy decoder 202 will be described with reference to FIG. 5. A transform unit (TU) size 502 and a scan pattern 501 are received by an inverse binariser module 503. The inverse binariser module 503 outputs residual coefficients 509 by performing the reverse operation of the binariser module 404. A context index 504 is output from the inverse binariser module 503 for each bin to be decoded. A context model 505 outputs a context 506 selected by the context index 504. A binary arithmetic decoder 507 decodes a bin value 508 from the encoded bitstream 113 using the context 506. The bin value 508 is received by the context model 505 and used to update the context 506. The bin value 508 is also received by the inverse binariser module 503.

Figure 6A:
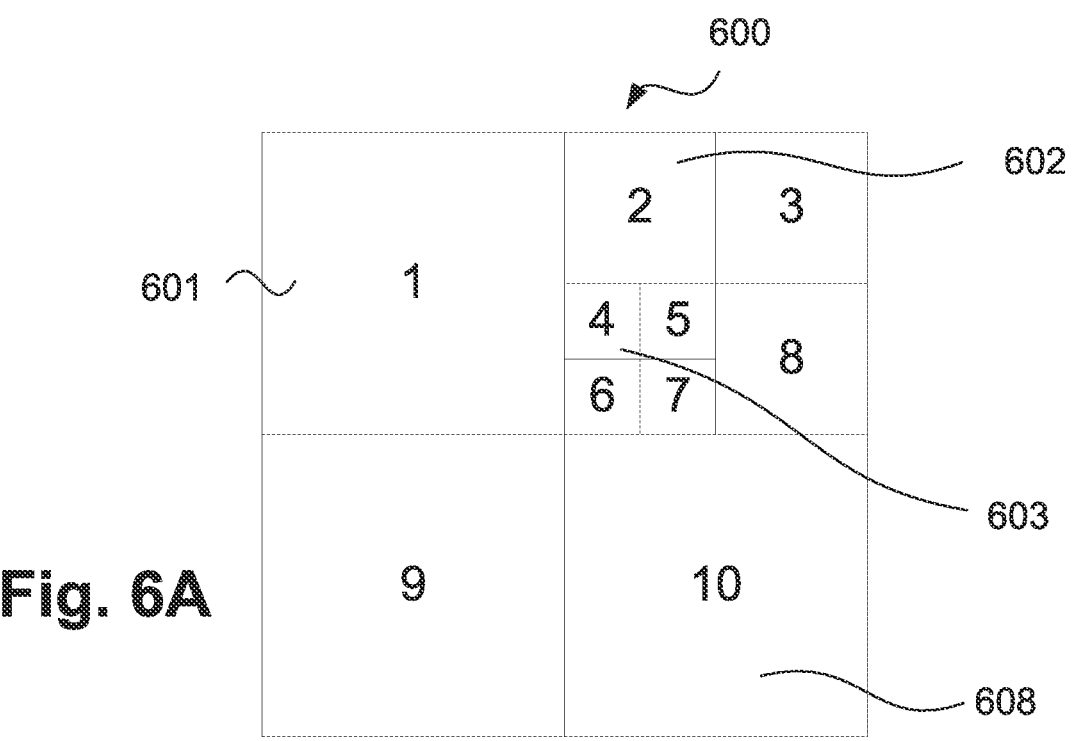
FIGS. 6A-6C include a schematic block diagram showing an exemplary largest coding unit (LCU)

An exemplary largest coding unit (LCU) 600 will be described with reference to FIG. 6A. The largest coding unit (LCU) 600 has a square shape of 64×64 luma samples. The largest coding unit 600 is recursively sub-divided into a coding unit 1 601 to coding unit 10 608. The division of the largest coding unit (LCU) 600 makes use of hierarchy levels, enabling the recursive splitting of a region containing the largest coding unit (LCU) into four equally-sized, square-shaped, non-overlapping regions, each having half the vertical and horizontal dimensions of the parent region and altogether fully occupying the area of the parent region. Once a region is no longer subdivided into smaller regions, a coding unit exists that fully occupies the region. At a particular level of sub-division, the region size becomes equal to a size known as a smallest coding unit (SCU), at which point further sub-division is not possible or may otherwise be prohibited by convention or practicality. For the high efficiency video coding (HEVC) standard under development, the smallest coding unit (SCU) size is configured as 8×8 luma samples. Each coding unit has one of several possible sizes, such as the coding unit 1 601 having size 32×32, a coding unit 2 602 having size 16×16 and a coding unit 4 603 having size 8×8. Other coding unit sizes are also possible, depending on the selected largest coding unit (LCU) size and the smallest coding unit (SCU) size used in the high efficiency video coding (HEVC) standard under development.

The subdivision of the largest coding unit (LCU) 600 will be further described with reference to FIG. 6B. Here, at a region of the largest coding unit (LCU) 604, a split occurs, dividing the region of the largest coding unit (LCU) into four equally sized regions, such as a region 605. A next split is used to give four further smaller regions, such as the region 607. Once the region size reaches the dimensions of the smallest coding unit (SCU), such as a region 606, no further split is possible. At each region where no further split occurs, a coding unit fully occupies the region.

Figure 6B:
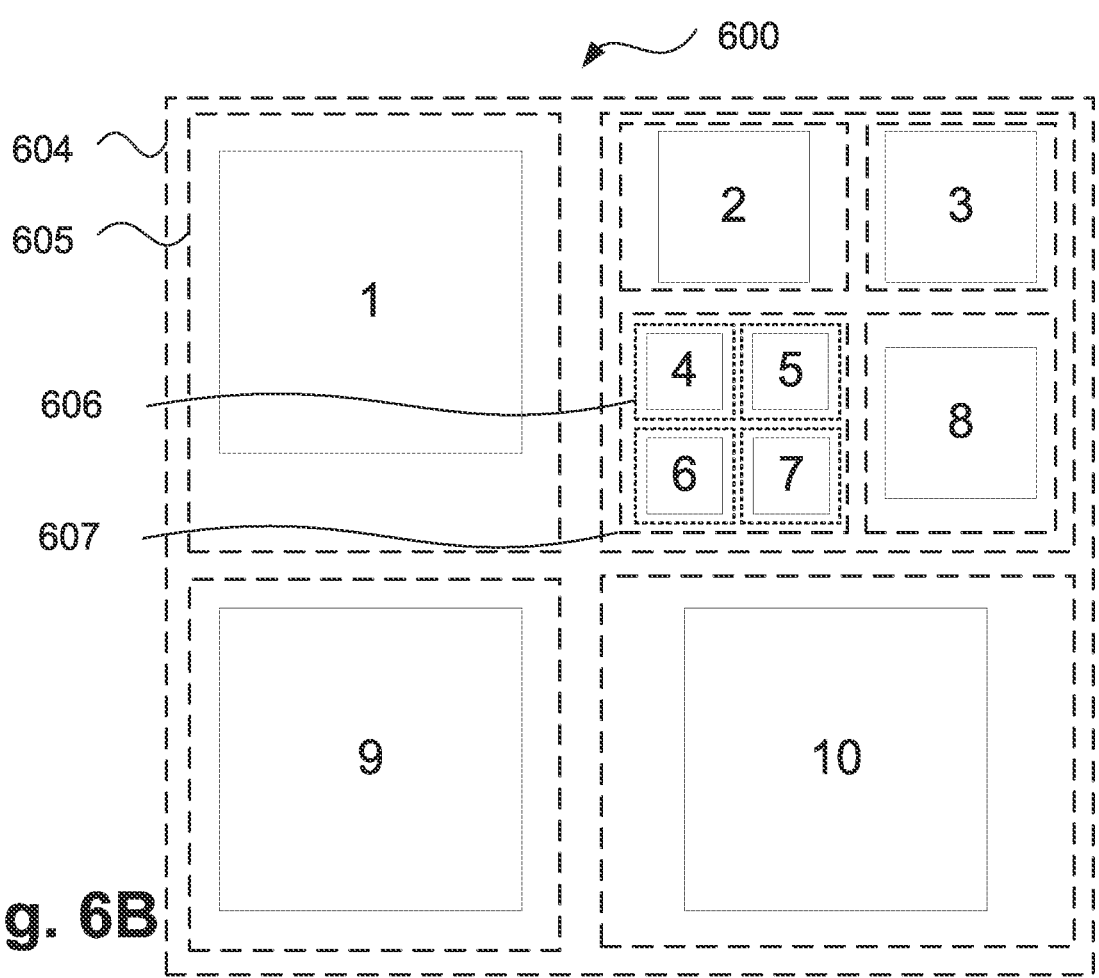
Figure 6C:
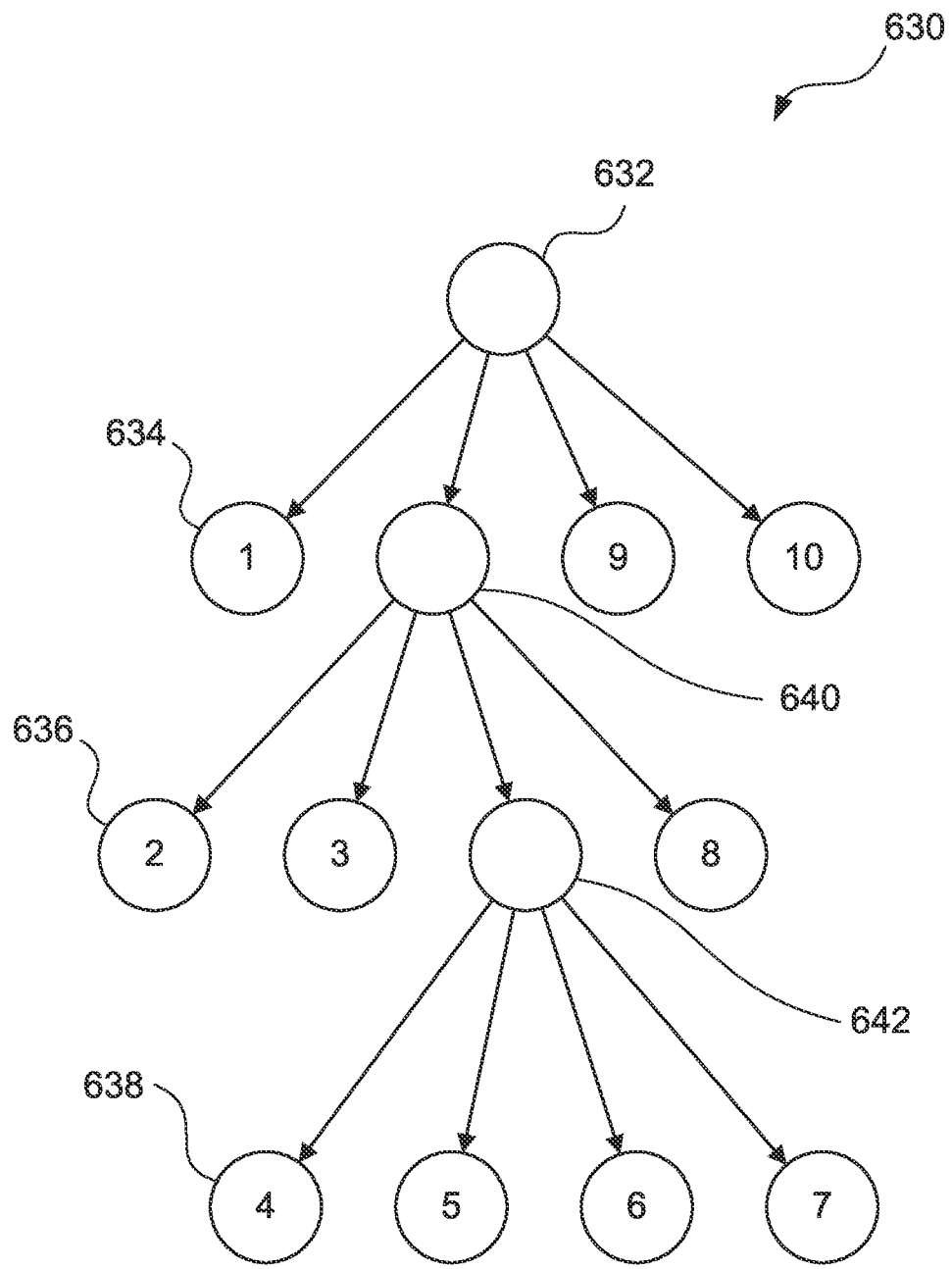

The largest coding unit (LCU) 604 of FIG. 6B may also be represented as a hierarchical coding tree 630 as shown in FIG. 6C. When using a hierarchical tree to represent the largest coding unit (LCU), each of the coding units will form leaf nodes, while regions that contain further subdivided regions will form non-leaf nodes. The root node 632 of the tree 630 is based on region 604 of FIG. 6B and is at a level representing 64×64 samples. Below the root node is a second layer representing regions of 32×32 samples, such as region 605. Coding unit 1 of FIG. 6A is represented as leaf node 634 while the region that contains coding units 2 to 8 is represented by non-leaf node 640. Regions of size 16×16 are shown on a third level of the tree 630 with leaf node 636 representing coding unit 2 and the region 607 of FIG. 6B is represented as non-leaf node 642. The fourth and final layer of the tree 630 represents regions of size 8×8, such as region 606 containing coding unit 4 603, being represented by the leaf node 638. It is clear from the above that the size of the coding units in the tree decreases as the depth of the tree increases.

As will be described in more detail below, a split flag is used to indicate that a region is a leaf node in the largest coding unit (LCU). The coding tree 630 may be considered as one way to represent a coding structure of the largest coding unit (LCU).

Figure 7:
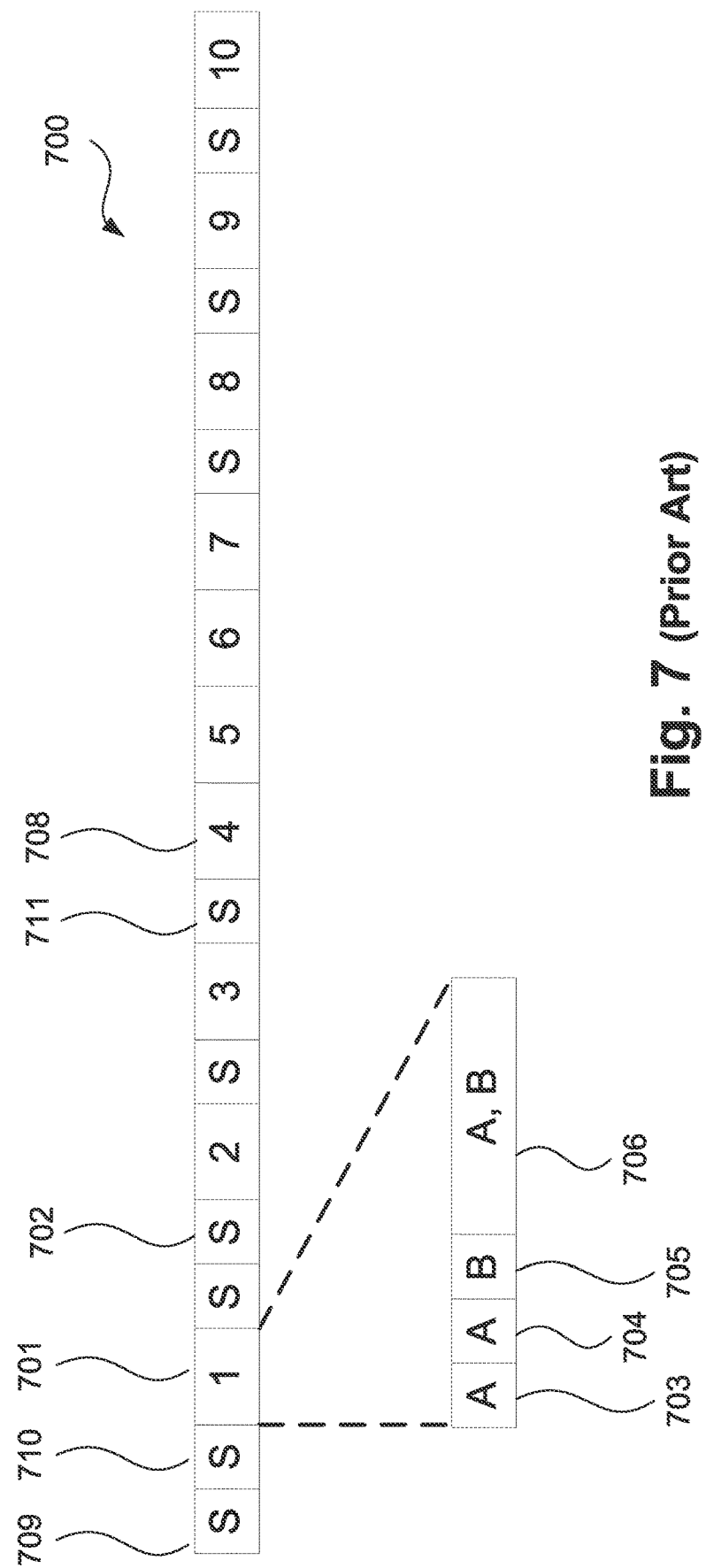
FIG. 7 is a schematic block diagram showing a conventional bitstream representing the exemplary largest coding unit (LCU)

A bitstream 700 encoding the largest coding unit (LCU) 600 in a conventional manner will be described with reference to FIGS. 6 and 7. As a video image frame may have many largest coding units (LCUs) per slice, an encoded bitstream, such as encoded bitstream 113, may comprise many instances of bitstream 700 shown in FIG. 7. FIG. 7 adopts a convention for representing encoded binarised syntax elements such that segments marked 'S' contain an arithmetically encoded split flag, segments marked 'A' contain one or more arithmetically encoded binarised syntax element or portion(s) thereof, segments marked 'B' contain one or more bypass encoded binarised syntax elements or portion(s) thereof, and segments marked 'A, B' contain one or more binarised syntax elements encoded using a mixture of arithmetic coding and bypass coding. The bitstream 700 represents a portion of the encoded bitstream 113, as slices typically consist of multiple largest coding units (LCUs) concatenated together. For frame sizes that are not integer multiples of the LCU dimensions, inference of split flags prevents the frame boundary passing through a coding unit. Coding units that would fall outside the frame boundary are not encoded in a bitstream. Coding unit 1 601 is encoded in bitstream 700 in a bitstream component 1 701. Coding unit 2 to coding unit 10 are likewise encoded in bitstream 700 in a bitstream component 2 to a bitstream component 10.

A split flag is used to indicate that a region is split, with a flag value of 1 indicating that the region is split while a flag value of 0 indicates that the region is not split. Regions that are split are subdivided into four equally sized non-overlapping smaller regions, which collectively occupy the entirety of the parent region. Any region that is equal in size to the predetermined smallest coding unit (SCU) will have a 0 value inferred for the split flag to indicate that the region is not subdivided. Any region that is larger than the size of the smallest coding units requires a split flag to be encoded.

A split flag 709 indicates that the region 604 of the largest coding unit (LCU) 600 is divided into four 32×32 regions, such as the region 605. A split flag 710 indicates that region 605 is not further divided. Coding unit 4 603 is a smallest coding unit (SCU) so further splitting is not possible. Therefore, split flags are not encoded for each of the coding units 4 to 7. However, there is a one-valued split flag to indicate that a region 607 is sub divided. The split flag 711 for the region 607 is located before coding unit 4 603.

Bitstream component 1 701 contains a binarised syntax elements using a mixture of arithmetic coding and bypass coding. An arithmetically coded prediction mode 703 determines whether coding unit 1 601 uses inter-prediction or intra-prediction. If the coding unit uses intra-prediction, an arithmetically coded most probable mode flag 704 encodes whether a most probable mode for intra-prediction is used or an alternative scheme for encoding the intra-prediction mode is used. If a most probable mode is in use, an intra-prediction mode code 705 bypass encodes a most probable mode index with a length of one bit. The most probable mode index determines which one of two predetermined most probable modes of intra-prediction is used for the coding unit. If a most probable mode is not used, the intra-prediction mode code 705 encodes a remaining mode that specifies an intra-prediction mode for the coding unit. The intra-prediction mode code 705 may have a length of 5 or 6 bits for the remaining mode. A data block 706 uses arithmetic and bypass encoding for one or more transform units within the coding unit 601. Bitstream component 1 701 contains all syntax elements required to decode coding unit 1. In a similar manner, bitstream components 2-10 contain the required syntax elements to decode coding units 2-10 respectively.

Figure 8:
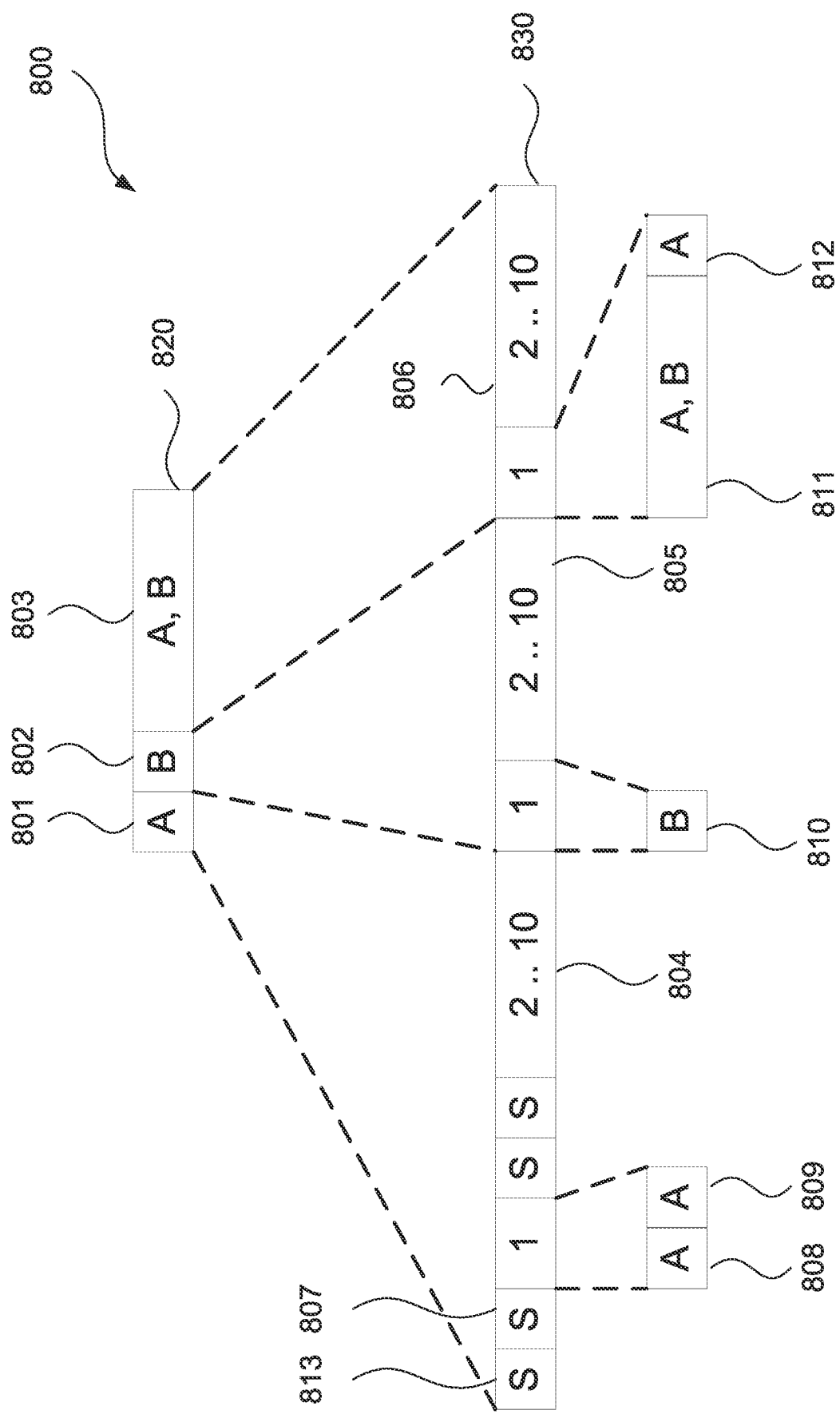
FIG. 8 is a schematic block diagram showing a bitstream according to the present disclosure representing the exemplary largest coding unit (LCU)

A bitstream 800 according to the present disclosure encoding the largest coding unit (LCU) 600 will be described with reference to FIGS. 6 and 8. FIG. 8 adopts the convention of FIG. 7 for representing encoded binarised syntax elements. The bitstream 800 represents a portion of the encoded bitstream 113 encoding the largest coding unit (LCU) 600. The bitstream 800 has three portions that can be seen at a first detail level 820, being an arithmetically encoded first data block 801 that groups information about the coding unit structure of coding units 1 to 10, a bypass encoded second data block 802 that groups information about intra-prediction modes for coding units 1-10, and a third data block 803 that contains both arithmetically and bypass encoded data and groups information for residual data for coding units 1-10. Unlike the bitstream 700, each of the three portions of the bitstream 800 may contain information about the coding units 1 to 10.

The arithmetically encoded first data block is preferably used to store split flags, prediction mode, and when intra-prediction is in use, most probable mode information for coding units 1 to 10 as required. The first data block is illustrated in more detail at a second detail level 830 of the bitstream 800 in FIG. 8. As shown at the second detail level 830, a first split flag 813 has a value of 1 to indicate that region 604 of the largest coding unit (LCU) 600 is divided into four 32×32 regions, such as region 605. A split flag 807 has a value of 0 to indicate that region 605 has no further divisions. A prediction mode 808 encodes a value to indicate whether coding unit 1 uses inter-prediction or intra-prediction. When coding unit 1 uses intra-prediction, a most probable mode flag 809 indicates if either a most probable mode or a remaining mode was used for intra-prediction of the coding unit. Further instances of split flags, prediction mode values and most probable mode flags are encoded in a bitstream portion 804 to represent coding units 2-10 of the largest coding unit (LCU) 600. First, split flag 813, split flag 807, prediction mode 808, most probable mode flag 809 and bitstream portion 804 all form part of bitstream portion 801 that may consist exclusively of arithmetically coded syntax elements.

The second block of data 802 contains bypass data 810 that is present in the bitstream 800 when coding unit 1 601 uses intra-prediction. When intra-prediction is in use and the most probable mode flag 809 indicates that the most probable mode is used, the bypass data 810 is an index encoding the use of one of two most probable modes. The index occupies a fixed length of one bit. Alternatively, when intra-prediction is used and the most probable mode flag 809 indicates that remaining mode is used, the bypass data 810 is an index encoding the use of one of 33 different remaining intra-prediction modes (out of 35 possible intra-prediction modes, the two most probable modes are excluded, leaving 33 remaining modes). In this case the bypass data 810 has a length of either 5 or 6 bits, depending on the encoded intra-prediction mode. The length or size of the bypass data 810 may be determined from the first 5 bits of bypass data 810, established by the coding unit structure. It is possible to determine if the sixth bit is required from the bitstream after inspecting the first 5 bits. When inter-prediction is in use for coding unit 1 601, bypass data 810 is omitted from the bitstream 800. Further instances of bypass data 810 are present for coding units 2-10 in a bypass data block 805 if at least one of coding units 2-10 uses intra-prediction. A bypass data block 802 encodes bypass data 810 and bypass data block 805 when required.

The third data block 803 is shown in more detail as arithmetic and bypass coded data block 811. The data block 811 encodes one or more transform units within coding unit 1 601 which contains residual coefficients for the transform units which can be used with the prediction mode information to generate video data. An arithmetically coded end of slice flag 812 is present in the same conditions as described with reference to FIG. 7.

A method 900 for decoding the bitstream 800 will be described with reference to FIGS. 6, 8 and 9. The method 900 receives the bitstream 800 and processes the three data blocks to enable decoding of the coding units in the bitstream 800. The method 900 starts with a determine split flag value step 901 where a value of a split flag, such as split flag 807, is determined. When the coding unit is larger than a smallest coding unit (SCU) the split flag value is determined by decoding a split flag from the bitstream 800. When the coding unit is equal in size to the smallest coding unit (SCU), such as coding unit 4 606, then the split flag value is inferred to be zero.

The value of the split flag is then used to determine if the coding unit structure is currently at a leaf node. If the split flag value is zero, a leaf node test step 902 passes control to a coding unit prediction mode step 903. Otherwise, leaf node test step 902 passes control back to the determine split flag value step 901, with the depth of the coding tree increased to indicate a region at one level below the present level in the coding tree, such as the tree 630 described above in relation to FIG. 6B. The regions are processed in a raster scan order by processing the coding tree in a depth first manner Use of the raster scan order ensures that coding units 1-10 in FIG. 6A are processed in order.

The coding unit prediction mode step 903 determines a prediction mode value. The prediction mode value is determined by decoding a prediction mode, such as prediction mode 808. The prediction mode specifies both the prediction mode used for the coding unit and the partition mode used to divide the coding unit into one or more prediction units. Possible partition modes are N×N or 2N×2N. If the partition mode is N×N, then the coding unit is split into 4 prediction units, each with a prediction mode. If the partition mode is 2N×2N then the coding unit contains only one prediction unit. The N×N and 2N×2N partition modes result in prediction units having a square shape. Other partition modes are also possible, for example 2N×N and N×2N, resulting in rectangular shaped prediction units. Note that intra-prediction or inter-prediction is specified at the coding unit level, so for N×N, all four prediction units will be intra-prediction, however each prediction unit may have a different intra-prediction mode, hence each prediction unit has separate most probable mode (MPM) flags and prediction mode. While the method 900 is generally described in relation to each coding unit having a single prediction unit, the method 900 may be extended to cover coding units that contain multiple prediction units.

When the split flag value is zero and the prediction mode value for the coding unit specifies intra-prediction, an MPM flag step 904 determines a most probable mode flag value. The most probable mode flag value is determined by decoding a most probable mode flag, such as most probable mode flag 804 of FIG. 8. A more nodes test step 905 determines if the last coding unit in the largest coding unit (LCU) has been encountered. If so, control passes to a determine intra-prediction mode step 906. If not, control returns to the determine split flag value step 901.

For a 32×32 intra-prediction coding unit, such as coding unit 1 601 of FIG. 6, the coding unit may contain either one, two or four prediction units, depending on the partition mode of the coding unit. Steps 906 and 907 iterate over the coding unit structure that was determined in steps 901 to 905. The determine intra-prediction mode step 906 determines the intra-prediction mode for a prediction unit as follows. If the most probable mode flag value for a prediction unit indicates a most probable mode has been used then a one-bit most probable mode index value is decoded from the bitstream 800 using bypass decoding. A one-bit most probable mode index value indicates which one of two possible most probable modes is in use. Otherwise, the most probable mode flag value indicates use of a remaining mode and a remaining mode value is decoded from the bitstream 800 using bypass decoding. The number of valid intra-prediction mode values, and the range of the variable length code, is dependent on the size of the prediction unit. Of the available intra-prediction modes for a given prediction unit size, the number of remaining modes is equal to the number of most probable modes subtracted from the number of available modes. When the number of remaining modes is a power of two, the remaining mode may use a fixed length code, otherwise a variable length code is used. For example, an intra-predicted 4×4 prediction unit with 18 available intra-prediction modes and two most probable modes has 16 remaining modes and therefore may use a four-bit code to encode the remaining mode. Alternatively, an intra-predicted 4×4 prediction unit with 19 available intra-prediction modes and two most probable modes has 17 remaining modes and therefore may use a four or five bit code to encode the remaining mode. For, an intra-predicted 8×8 prediction unit with two most probable modes has 33 remaining modes and therefore may use a variable length code of either five or six bits to In one implementation the variable length code is decoded by reading at least a sufficient number of bins to determine a length of the variable length code used for the remaining mode. For such prediction units it is possible to decode five bits to determine if a sixth bit is required to be decoded. As a result, a second read may be performed to decode the subsequent portion of the remaining mode based on the decoded sufficient bits. An alternative implementation introduces an arithmetically coded remaining mode flag, encoded after the most probable mode flag, indicating that the prediction unit uses a predetermined remaining mode. If the predetermined remaining mode, for example 'planar intra-prediction', is not in use, one of the other remaining modes is encoded using the bypass-coded remaining mode syntax element. For example, if an intra-predicted 4×4 prediction unit has 19 available modes, with two most probable modes and one predetermined remaining mode, 16 other remaining modes exist, which may be coded using a fixed-length four-bit remaining mode syntax element. Also, if an intra-predicted 8×8 prediction unit has 35 available modes, with two most probable modes and one predetermined remaining mode, 32 other remaining modes exist, which may be encoded using a fixed length five-bit remaining mode syntax element. Where the number of remaining modes or other remaining modes is a power of two, a fixed-length code is sufficient to encode the remaining mode or other remaining mode used. The intra-prediction mode for the prediction unit is then determined using the most probable mode flag value and one of either the most probable mode index value or the remaining mode value. Alternatively, the predetermined remaining mode flag and optionally the other remaining mode are used to determine the intra-prediction mode for the prediction unit. Where multiple variable-length codes are concatenated, it is possible perform a read of the minimum length of the combined codes to determine if further reads are necessary to complete decoding of the codes. The bitstream 800 may encode each of the minimum-length portions of the variable-length remaining modes adjacently in the second data block 802 and then encode any remaining data of the variable-length remaining modes in the second data block 802. Using this encoding, it is possible for implementations to read all the minimum-length portions in one read and determine the length of the remaining data to complete reading of the variable-length remaining modes.

A more nodes test step 907 determines if there are any more nodes of the coding tree that need to have their intra-prediction mode determined. The result of executing step 907 is that the determine intra-prediction mode step 906 iterates over all nodes of the largest coding unit (LCU).

A decode residual data step 908 decodes the third data block 803. The decode residual data step 908 decodes each of the transform units for coding units 1-10 in the largest coding unit (LCU) 600. As each transform unit is decoded, the inverse scale and transform module 203 converts the residual data from the frequency domain to the spatial domain to produce the residual samples 224. Using the intra-prediction mode, intra-frame prediction module 205 determines the prediction 234 for each prediction unit. Further steps for decoding the largest coding unit (LCU) 600 accord with the operation described in FIG. 2.

A method 1000 for decoding the bitstream 800 will be described with reference to FIG. 10. The method 1000 starts with a determine coding unit structure step 1001 that constructs a coding unit structure to represent the division of a largest coding unit (LCU) into multiple coding units based on the split flag information in the arithmetically encoded first data block 801. Other information about the coding units is also determined from the first data block 801. The information includes a prediction mode value for the coding unit and MPM flags for any prediction units of the coding unit. Further detail of how this is done is described above in FIG. 9 in the determine split flag value step 901, the leaf node step 902, the determine coding unit prediction mode value step 903, the determine prediction unit MPM flag value step 905, and the more nodes step 906.

Next, a decode bypass encoded data step 1002 decodes the bypass encoded second data block 802. The bypass encoded second data block 802 provides information on the intra-prediction modes used for each of the intra-predicted coding units of the largest coding unit (LCU). The decode bypass encoded data step 1002 is described in more detail in the determine intra-prediction mode step 906 and the more nodes step 907 of FIG. 9, described above.

The method 1000 then proceeds to a decode residual data step 1003 where residual data is decoded from the third data block 803. As described above, the third data block 803 contains data that is both arithmetically and bypass encoded. The decoding of the residual data step 1003 is described in more detail in the decode residual data step 908 of FIG. 9 above.

Finally, a form coding units step 1004 combines the intra-prediction mode from the decode bypass encoded data step 1002 and the residual data from the decode residual data step 1003 to form decoded coding units, as described in relation to FIG. 2. Once a decoded coding unit has been formed, the intra-prediction mode and the residual data can be combined to form part of a decoded video frame.

Figure 14:
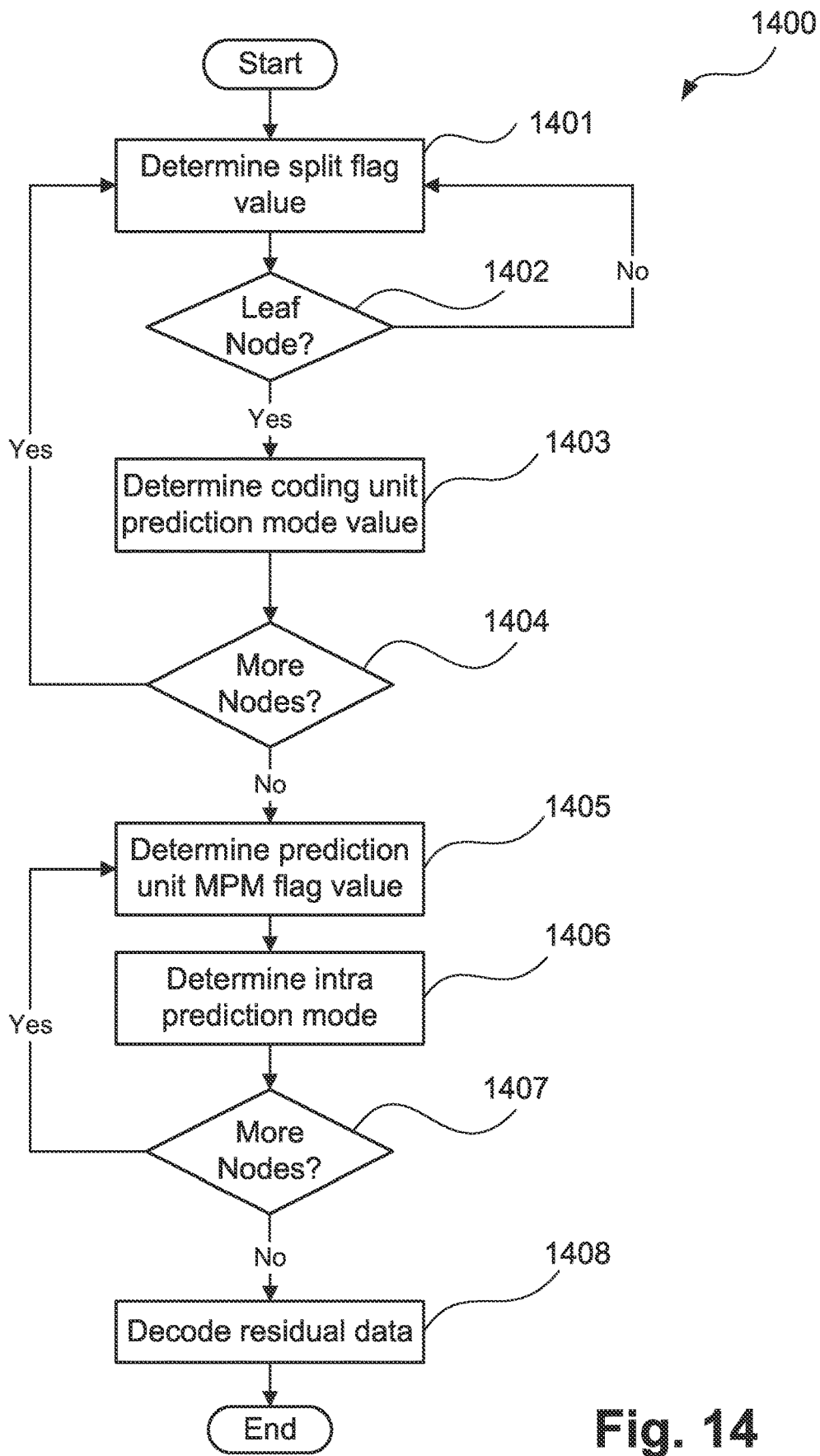
FIG. 14 is a schematic flow diagram showing an alternative method according to the present disclosure for decoding the syntax elements of a largest coding unit (LCU)
Figure 17:
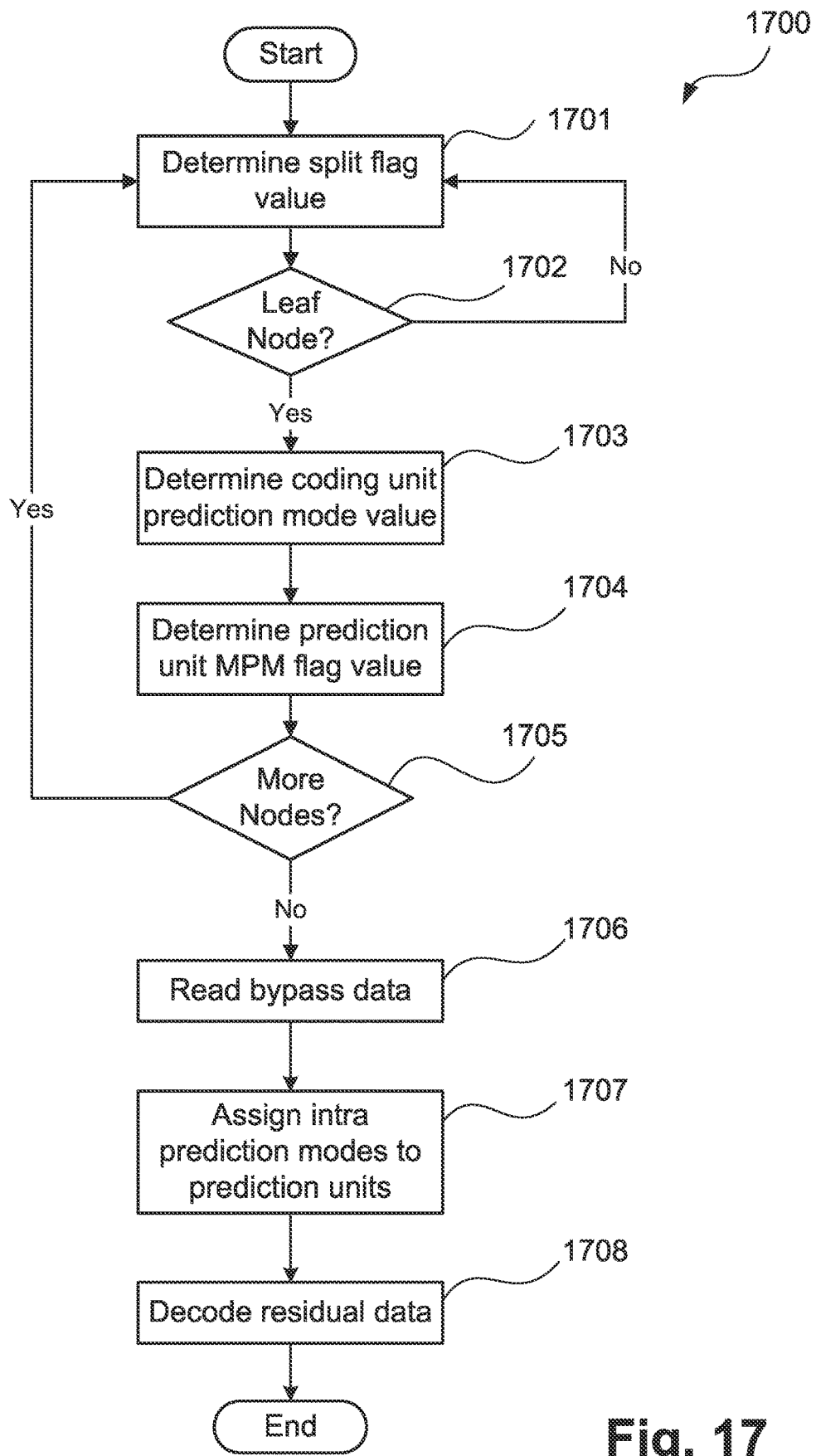
FIG. 17 is a schematic flow diagram showing a further alternative method according to the present disclosure for decoding the syntax elements of a largest coding unit (LCU).

While method 1000 has been described in relation to method 900 of FIG. 9 the method may also cover other methods such as method 1400 of FIG. 14 and method 1700 of FIG. 17 that will be described below.

A method 1100 for encoding the bitstream 800 will now be described with reference to FIG. 11. The method 1100 encodes the bitstream 800 and produces the three data blocks to enable decoding of the coding units in the bitstream 800. The method 1100 starts with an encode split flag value step 1101 where a value of a split flag, such as split flag 807, is encoded. The rules governing the location of split flags are discussed in more detail above in relation to FIGS. 6A and 6B. When a coding unit is larger than a smallest coding unit (SCU) a split flag encodes the appropriate split flag value into the bitstream 800. However, the split flag is not encoded when the coding unit is equal in size to the smallest coding unit (SCU), such as coding unit 4 606 of FIG. 6B.

If the split flag value is zero, a leaf node test step 1102 passes control to an encode coding unit prediction mode value step 1103 as the zero of the split flag indicates the current coding unit is a leaf node of the coding tree. If the current node of the coding tree is a non-leaf node then the leaf node test step 1102 passes control back to the encode split flag value step 1101, with the depth of the coding tree increased to a region one level below a present level in the coding tree, such as the tree 630 described above in relation to FIG. 6C. As with method 900 of FIG. 9, the regions are processed in a raster scan order by processing the coding tree in a depth first manner Use of the raster scan order ensures that coding units 1-10 in FIG. 6A are processed in order.

An encode unit prediction mode step 1103 encodes a prediction mode value. For slices containing both inter-predicted prediction units and intra-predicted prediction units, the prediction mode specifies the type of prediction used. For slices containing only intra-predicted prediction units, the prediction mode is not encoded in the encoded bitstream 113. In a similar manner to method 900 of FIG. 9, the prediction mode specifies both the prediction mode used for the coding unit and the partition mode. While the method 1100 is described in relation to a coding unit with a single prediction unit, the method may be extended to cover coding units that contain multiple prediction units.

When the split flag value is zero and the prediction mode value for the coding unit specifies intra-prediction, an encode MPM flag step 1104 encodes a most probable mode flag value. The intra-frame prediction module 109 of FIG. 1 determines the intra-prediction mode for a prediction unit. The intra-prediction prediction module 109 also determines two most probable modes for intra-prediction. If the determined intra-prediction mode is equal to one of the most probable modes, the most probable mode flag value is set to 1, indicating use of a most probable mode. Otherwise, the most probable mode flag value is set to 0, indicating use of a remaining mode. A most probable mode flag, such as most probable mode flag 804 of FIG. 8, is encoded as the most probable mode flag value. A more nodes test step 1105 determines if the last coding unit in the largest coding unit (LCU) has been encountered. If so, control passes to an encode bypass data step 1106. If not, control returns to execute the encode split flag value step 1101.

For a 32×32 intra-prediction coding unit, such as coding unit 1 601 of FIG. 6, the coding unit may contain either one, two or four prediction units, depending on the partition mode of the coding unit. The encode bypass data step 1106 encodes the intra-prediction mode for a prediction unit as follows. If the most probable mode flag value for a prediction unit indicates a most probable mode has been used, then a one-bit most probable mode index value, indicating which one of the two available most probable modes was selected, is encoded into the bitstream 800 using bypass decoding. Otherwise, the most probable mode flag value indicates use of a remaining mode and a remaining mode value is encoded into the bitstream 800 using bypass encoding. Where multiple most probable mode index values or remaining mode values are concatenated, it is possible perform a write the combined codes in a single operation instead of writing the code for each prediction unit separately.

A more nodes test step 1107 determines if there are any more nodes of the coding tree that need to have their intra-prediction mode determined. The result is that the encode bypass data step 1106 executes to iterate over all nodes of the largest coding unit (LCU). The iteration over encode bypass data step 1106 and more nodes step 1107 may take place prior to writing bypass data to the encoded bitstream 113 in order to predetermine the length of the data to be written.

An encode residual data step 1108 encodes the third data block 803. The encode residual data step 1108 encodes each of the transform units for coding units 1-10 in the largest coding unit (LCU) 600 into the encoded bitstream 113. In order to encode each transform unit, the residual samples 122 are transformed by the transform block 102 into transform coefficients 124. The scale and quantise block 103 then converts the transform coefficients 124 into residual coefficients 126. The residual coefficients 126 are encoded by entropy encoder 104 to the encoded bitstream 113. Further steps for encoding the largest coding unit (LCU) 600 accord with the operation described in video encoder 100 of FIG. 1.

Figure 12:
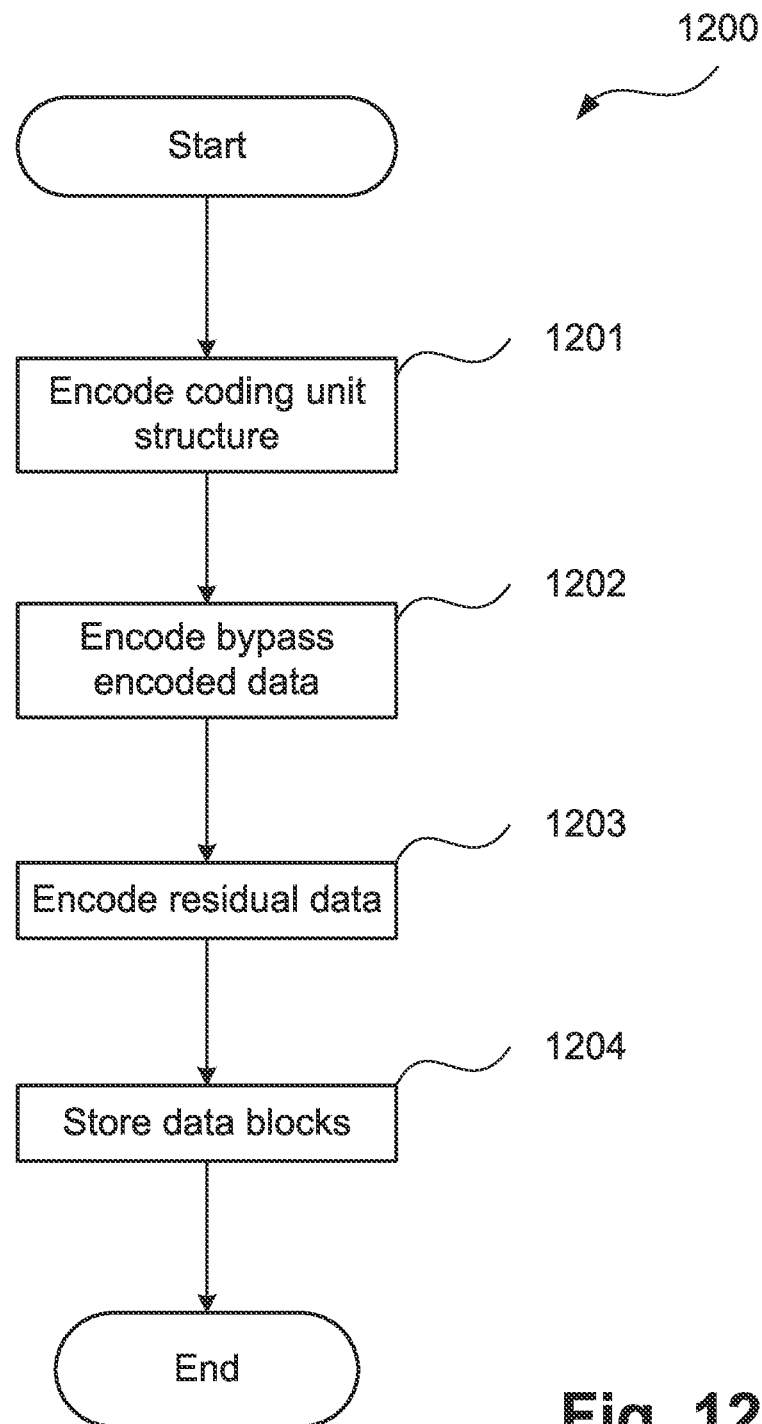
FIG. 12 is a schematic flow diagram showing a summarised method according to the present disclosure for encoding the syntax elements of a largest coding unit (LCU) of a bitstream.

A method 1200 for encoding the bitstream 800 will be described with reference to FIG. 12. The method 1200 starts with an encode coding unit structure step 1201 that encodes a coding unit structure to represent the division of a largest coding unit (LCU) into multiple coding units by encoding split flag information in the arithmetically encoded first data block 801. Other information about the coding units is also encoded into the first data block 801. The information includes a prediction mode value for the coding unit and MPM flags for any prediction units of the coding unit. Further detail of how this is done is described above in FIG. 11 in the encode split flag value step 1101, the leaf node step 1102, the encode coding unit prediction mode value step 1103 step, the encode prediction unit MPM flag value step 1105, and the more nodes step 1106.

Next, an encode bypass encoded data step 1202 encodes the bypass encoded second data block 802. The bypass encoded second data block 802 encodes information on the intra-prediction modes used for each of the intra-predicted coding units of the largest coding unit (LCU). The encode bypass encoded data step 1202 is described in more detail in the encode bypass data step 1106 and the more nodes step 1107 of FIG. 11, described above.

The method 1200 then proceeds to an encode residual data step 1203 where residual data is encoded into the third data block 803. As described above, the third data block 803 contains data that is both arithmetically and bypass encoded. The encoding of the residual data step 1203 is described in more detail in the encode residual data step 1108 of FIG. 11 above.

A store data blocks step 1204 stores arithmetically coded data in data block 801, bypass coded data in data block 802 and a mixture of arithmetically coded and bypass coded data in data block 803 into the encoded bitstream 113. The store data blocks step 1204 may be implemented as a single step of storing the data blocks, or as intermediate buffering of encoded data as the data blocks are produced by their respective steps in the method 1200.

While method 1200 has been described in relation to method 1100 of FIG. 11 the method may also cover other encoding methods related to the decoding such as method 1400 of FIG. 14 and method 1700 of FIG. 17 that will be described below.

Figure 13:
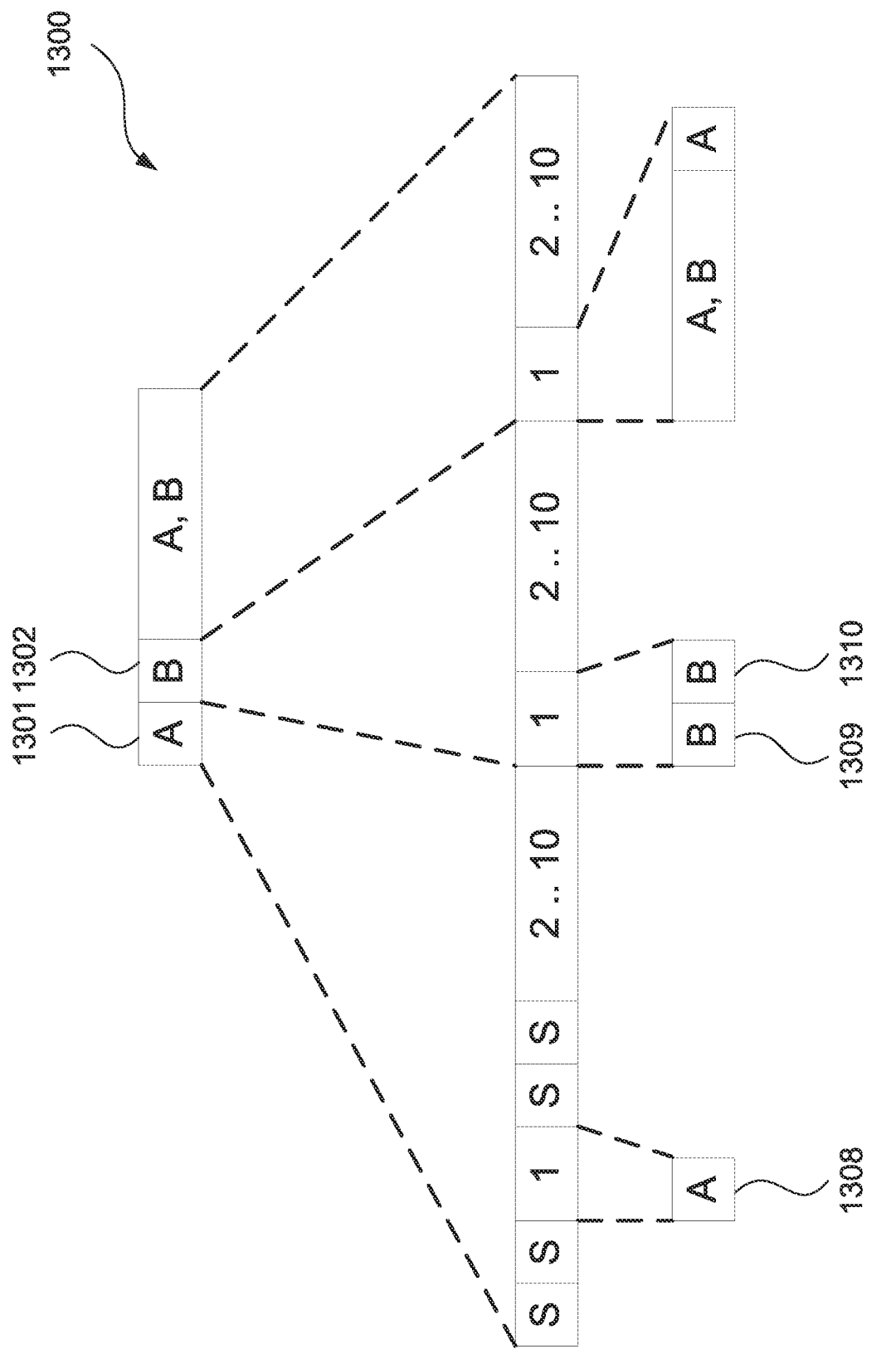
FIG. 13 is a schematic block diagram showing a bitstream representing the exemplary largest coding unit (LCU) produced by the alternative method according to the present disclosure for parsing.

An alternative bitstream 1300 for encoding the largest coding unit (LCU) 600 will be described with reference to FIG. 13. FIG. 13 adopts the convention of FIG. 7 for representing encoded binarised syntax elements. The bitstream 1300 represents a portion of the encoded bitstream 113 encoding largest coding unit (LCU) 600. A first data block 1301 has a similar structure to first data block 801 and encodes syntax elements using arithmetic coding exclusively. The first data block 1301 is similar to the first data block 801, as the first data block 1301 arithmetically encodes a prediction mode value for a coding unit using a prediction mode, such as prediction mode 1308. In contrast to the first data block 801, the first data block 1301 does not encode a most probable mode flag, such as the most probable mode flag 809 of the first data block 801. Instead, a most probable mode flag 1309 is encoded in a second data block 1302 using bypass coding. The second data block 1302 uses bypass coding exclusively to encode syntax elements as described for the second data block 802. Encoding the most probable mode flag with bypass encoding may allow decoding with a higher throughput by reading larger groups of bypass bins in a single read operation. In a similar manner to bypass data 810, when a prediction mode 1308 indicates use of intra-prediction, the bitstream 1300 includes bypass data 1310 that represents either a most probable mode index or a remaining mode.

An alternative implementation will now be described in relation to method 1400 of FIG. 14 for decoding the alternative bitstream 1300. A determine split flag value step 1401, a leaf node step 1402, a determine coding unit prediction mode value step 1403, and a more nodes step 1404 operate similarly to determine split flag value step 901, leaf node step 902, determine coding unit prediction mode value step 903, and more nodes step 905 of FIG. 9. In contrast to method 900, a step corresponding to the determine prediction unit MPM flag value step 904 of FIG. 9 is not included in the above set of steps of FIG. 14. Instead the corresponding step, being step 1405 occurs later in method 1400. The determine prediction unit MPM flag value step 1405 determines a prediction unit MPM flag value similarly to corresponding step 904 of FIG. 9 except that a bypass-coded most probable mode flag 1309 is decoded from bitstream 1300. A determine intra-prediction mode step 1406, a more nodes step 1407 and a decode residual data step 1408 operate as described with reference to determine intra-prediction mode step 906, more nodes step 907 and decode residual data step 908 of FIG. 9.

Figure 15:
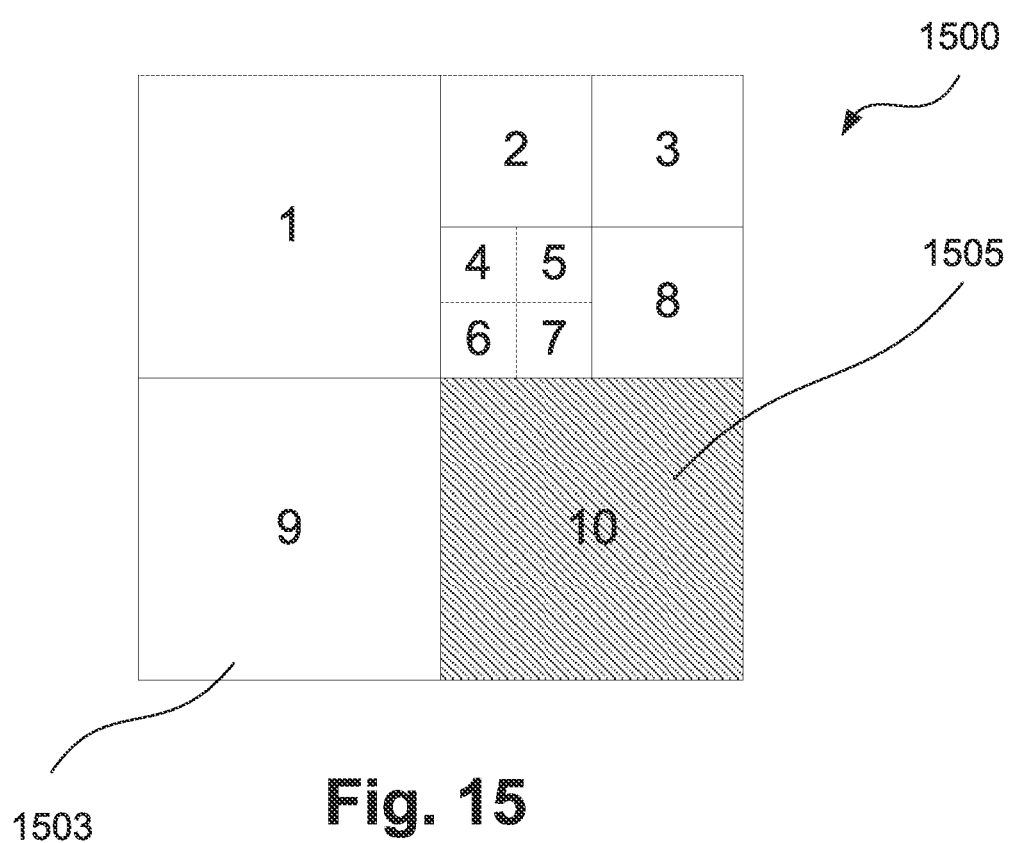
FIG. 15 is a schematic block diagram showing an exemplary largest coding unit (LCU) with a slice boundary within the largest coding unit (LCU)

An exemplary largest coding unit (LCU) 1500 of FIG. 15 will now be described. The largest coding unit (LCU) 1500 has an identical composition of coding units 1-10 as the largest coding unit (LCU) 600 of FIG. 6. However, in contrast to the largest coding unit (LCU) 600, the largest coding unit (LCU) 1500 includes a slice boundary between a coding unit 9 1503 and a coding unit 10 1505 as fine granularity slices has been enabled. Accordingly, coding units 1-9 of FIG. 15 are in a first slice while coding unit 10 1505 is in a second slice.

Figure 16:
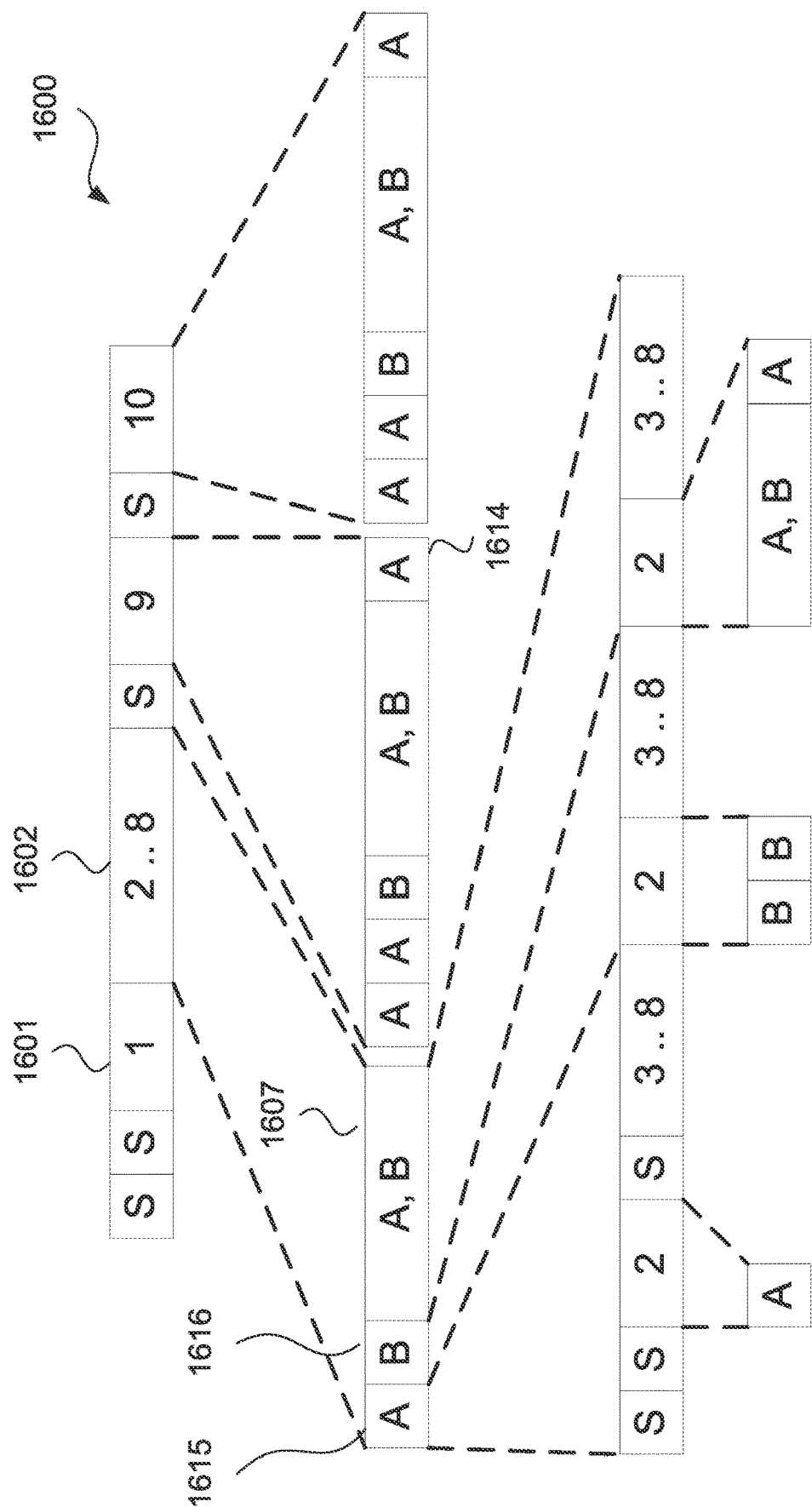
FIG. 16 is a schematic block diagram showing a bitstream representing the exemplary largest coding unit (LCU) produced by the method for parsing with fine granularity slices (FGS) enabled.

A bitstream 1600, shown in FIG. 16, encoding the largest coding unit (LCU) 1500 will now be described. The bitstream 1600 is encoded with fine granularity slices enabled and the fine granularity slice threshold configured to limit slice boundaries to 32×32 coding unit boundaries. When fine granularity slices are enabled, the largest coding unit (LCU) 1500 may be split into separate slices at any region of a size equal to or exceeding the fine granularity slice threshold. A slice end syntax element indicates the termination of a slice. The slice end syntax element is coded after the last coding unit in each region whose size is equal to the fine granularity slice threshold. In FIG. 16 there are four slice end syntax elements as the 64×64 largest coding unit (LCU) has a boundary size of 32×32. The slice end syntax flag element will be located after coding units 1, 8, 9 and 10. It is a requirement that syntax elements in one slice fully describe the coding units in that slice. When fine granularity slices are enabled, the decision to split the largest coding unit (LCU) 1500 into two slices may be made mid-way through encoding the bitstream 1600. Accordingly, when information from a plurality of coding units is grouped together in a first, second and third data block, the coding units of the group may not extend past an end flag. A bitstream component 1601 comprises syntax elements for coding unit 1. A bitstream component 1602 comprises a first data block 1615, a second data block 1616, and a third data block 1607 encoding coding units 2-8 of FIG. 15 contained in region 607. First data block 1615, second data block 1616 and third data block 1607 encoding coding units 2-8 of FIG. 15 are similar to first data block 801, second data block 802 and third data block 803 of FIG. 8. In contrast to the bitstream 800, the grouping of syntax elements into first, second and third data blocks in bitstream 1600 is restricted to the fine granularity slice threshold. As the fine granularity slice threshold is set to 32×32, then coding units 1, 9 and 10 are not grouped with other coding units, while coding units 2 to 8 are grouped together. A slice end flag 1614 signals that the first slice terminates following coding unit 9 1503, and the second slice begins on coding unit 10 1505 of FIG. 15.

In one implementation, the bitstream 1600 encodes a fine granularity slice enable flag at the start of each largest coding unit (LCU), such as largest coding unit (LCU) 1500. When the fine granularity slices are not enabled for a largest coding unit (LCU), the method 900 is applied to that largest coding unit (LCU). When fine granularity slices are enabled for a largest coding unit (LCU), the method 900 is applied to each subdivided coding unit equal in size to the fine granularity slice threshold.

A further alternative implementation will now be described in relation to method 1700 of FIG. 17 for decoding the bitstream 800. A determine split flag value step 1701, a leaf node step 1702, a determine coding unit prediction mode value step 1703, a determine prediction unit MPM flag value step 1704, and a more nodes step 1705 operate similarly to corresponding steps of FIG. 9, being the determine split flag value step 901, leaf node step 902, determine coding unit prediction mode value step 903, determine prediction unit MPM flag value step 904, and the more nodes step 905. The resulting coding unit structure and most probable mode information are used by a read bypass data step 1706 to read bypass data block 802. The length of bypass data block 802 is determined by the coding unit structure and the most probable mode information by summing of the lengths of the most probable mode indexes and the remaining modes. The read bypass data step 1706 may read the bypass data block 802 in a single operation, or multiple operations, but it is not restricted to reading information for one prediction unit at a time. The amount of data to be read is the length of bypass data block 802 that is already determined.

Next, an assign intra prediction modes to prediction unit step 1707 divides the bypass data from the read bypass data step 1706 and determines the intra-prediction mode for each prediction unit. A decode residual data step 1708 operates as described with reference to the decode residual data step 908 of FIG. 9.

When the remaining mode is coded using a variable length code, such as the five or six bit code described with reference to FIG. 9, the length of the bypass coded data 802 cannot be determined prior to the read bypass data step 1706. Instead, a minimum length can be calculated based on knowledge of the coding unit structure and the most probable mode flag values and prediction unit sizes. The minimum length may be read from the encoded bitstream 113 and parsed to determine the intra-prediction mode of at least one of the prediction units. The parsing may be applied repeatedly until the length of bypass data is known. One or more subsequent bypass data reads may be performed to read the entirety of bypass coded data 802 from encoded bitstream 113. While the variable-length code for bypass data technique of the alternative implementation described above is described in relation to method 1700 of FIG. 17, the technique may be applied during other decoding methods described above, such as method 900 of FIG. 9.

When the most probable mode flag is bypass coded, a variation of method 1700 can operate to delete the determine prediction unit MPM flag value step 1704 and incorporates the functionality of the determine prediction unit MPM flag value step 1704 into the read bypass data step 1706.

An alternative implementation for consuming bypass coded data of unknown length, operates to access the encoded bitstream 113 to determine a segment of data, containing at least some bypass coded data. However, unlike previously described approaches, the data is not consumed from the bitstream. Most probable mode indices and remaining modes are decoded from the segment of data, and a running total is kept for a length of the decoded data. Once all bypass encoded data is decoded from the segment of data, the running total length is then consumed from the bitstream. The result is that the segment of data accesses bitstream data beyond the bypass coded second data block 802, but the data is not consumed, and hence arithmetic and bypass third data block 803 is available for decoding by the decode residual data step. While the variable-length code decoding technique of the alternative implementation described above is described in relation to method 1700 of FIG. 17, the technique may be applied during other decoding methods described above, such as the method 900 of FIG. 9.

The methods 900, 1000, 1400 and 1700 when applied to video decoder 200 enable implementations to realise an increase in the throughput of parsing an encoded bitstream, such as encoded bitstream 113. This occurs through reading larger quantities of bypass coded data in a single operation, due to the concatenation of bypass coded data. The increased throughput is most noticeable for hardware implementations where reading or writing of bypass encoded data can be conducted in parallel to increase the throughput of the system. A similar benefit is realised for video encoder 100 when methods 1100, 1200, and methods 1400 and 1700 accordingly varied to perform encoding, are applied for producing an encoded bitstream.

Figure 9:
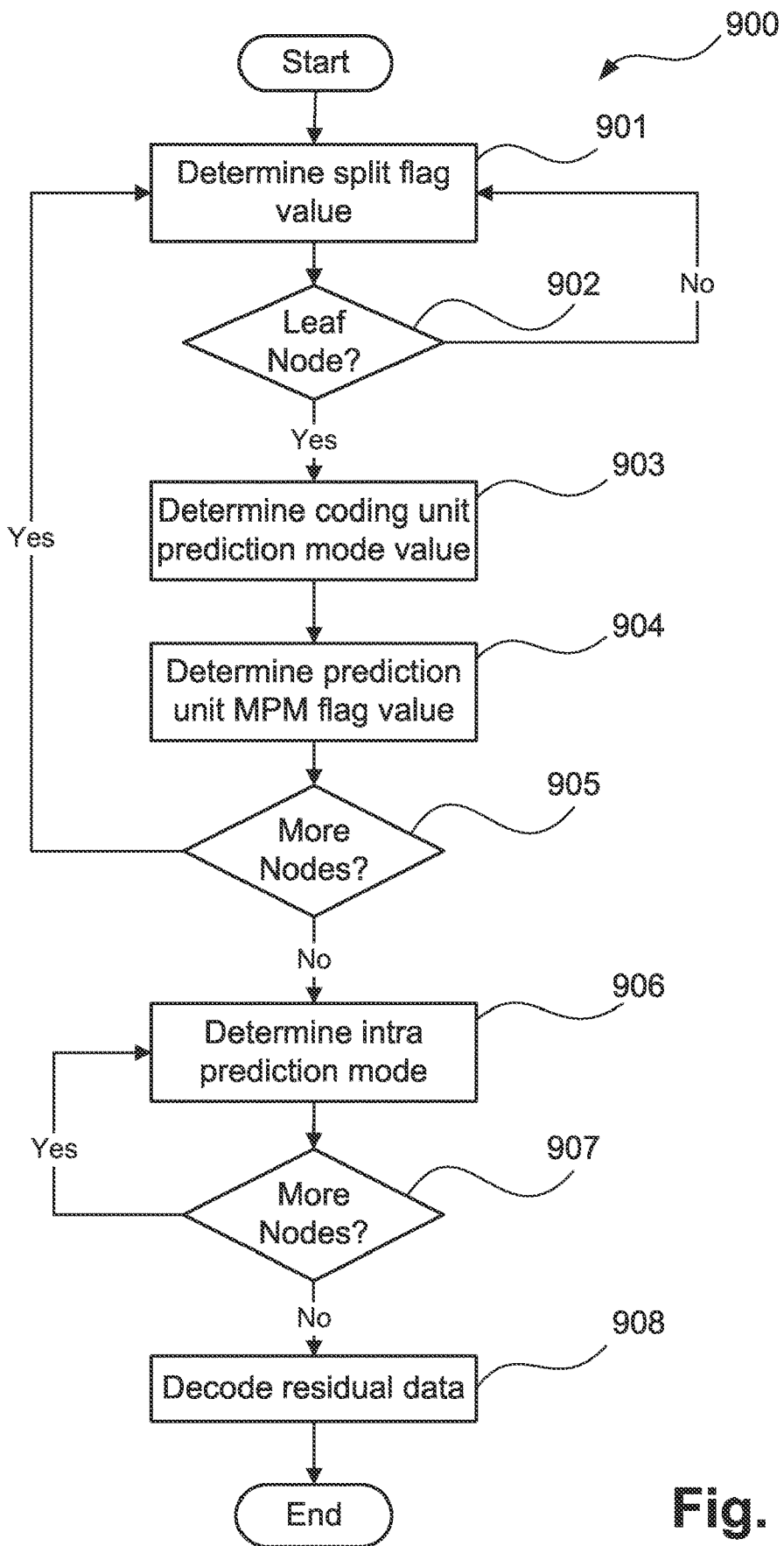
FIG. 9 is a schematic flow diagram showing a method according to the present disclosure for decoding the syntax elements of a largest coding unit (LCU) of a bitstream akin to that of FIG. 8.

Appendix A which follows this detailed description represents modifications that can be made to the high efficiency video coding (HEVC) test model 5.0 (HM-5.0) to specify the bitstream 800 of FIG. 8 which can be decoded by method 900 of FIG. 9 described above.

INDUSTRIAL APPLICABILITY

The arrangements described are applicable to the computer and data processing industries and particularly for the digital signal processing for the encoding a decoding of signals such as video signals.

The foregoing describes only some embodiments of the present invention, and modifications and/or changes can be made thereto without departing from the scope and spirit of the invention, the embodiments being illustrative and not restrictive.

(Australia only) In the context of this specification, the word "comprising" means "including principally but not necessarily solely" or "having" or "including", and not "consisting only of". Variations of the word "comprising", such as "comprise" and "comprises" have correspondingly varied meanings.

APPENDIX A

The following represent modifications that may be made to the high efficiency video coding (HEVC) test model 5.0 (HM-5.0) to specify the bitstream 800 of FIG. 8 which can be decoded by method 900 of FIG. 9 described above.

Coding Tree Syntax

| | Descriptor |
|---|---|
| coding_tree( x0, y0, log2CUSize, cuDepth ) { | |
|   if (slice_type == I &&SliceGranularity == 0) { | |
|     if (cuDepth == 0) { | |
|       coding_tree_split_and_mpm_flags(x0, y0, log2CUSize) | |
|       coding_tree_luma_intra_mode(x0, y0, log2CUSize) | |
|     } | |
|   } else { | |
|     if( x0 + ( 1 << log2CUSize ) <= PicWidthInSamples$_L$&& | |
|       y0 + ( 1 << log2CUSize ) <= PicHeightInSamples$_L$&& | |
|       cuAddress( x0, y0) >= SliceAddress && | |
|       log2CUSize > Log2MinCUSize ) { | |
|       split_coding_unit_flag[ x0 ][ y0 ] | ae(v) |
|     } | |
|   } | |
|   if( adaptive_loop_filter_flag && alf_cu_control_flag ) { | |
|     if( cuDepth <= alf_cu_control_max_depth ) | |
|       if( cuDepth == alf_cu_control_max_depth \|\| | |
|         split_coding_unit_flag[ x0 ][ y0 ] == 0 ) | |
|         AlfCuFlagIdx++ | |
|   } | |
|   if( cu_qp_delta_enabled_flag && | |
|     log2CUSize >= log2MinCUDQPSize ) | |
|     IsCuQpDeltaCoded = 0 | |

| Descriptor |
|---|

```
    if( split_coding_unit_flag[ x0 ][ y0 ] ) {
        x1 = x0 + ( ( 1 << log2CUSize ) >> 1 )
        y1 = y0 + ( ( 1 << log2CUSize ) >> 1 )
        if( cuAddress( x1, y0 ) > SliceAddress)
            moreDataFlag = coding_tree( x0, y0, log2CUSize −
1, cuDepth + 1 )
        if( cuAddress( x0, y1 ) > SliceAddress && moreDataFlag
&&
            x1 < PicWidthInSamples_L )
            moreDataFlag =
coding_tree( x1, y0, log2CUSize − 1, cuDepth + 1 )
        if( cuAddress( x1, y1 ) > SliceAddress && moreDataFlag
&&
            y1 < PicHeightInSamples_L )
            moreDataFlag =
coding_tree( x0, y1, log2CUSize − 1, cuDepth + 1 )
        if( moreDataFlag &&
            x1 < PicWidthInSamples_L && y1 < PicHeightInSamples_L
)
            moreDataFlag =
coding_tree( x1, y1, log2CUSize − 1, cuDepth + 1 )
    } else {
        if(adaptive_loop_filter_flag && alf_cu_control_flag )
            AlfCuFlag[ x0 ][ y0 ] = alf_cu_flag[ AlfCuFlagIdx ]
        coding_unit( x0, y0, log2CUSize)
        if( (slice_type != I || SliceGranularity != 0)&&
            granularity_block_boundary( x0, y0, log2CUSize ) ) {
            end_of_slice_flag                                  ae(v)
            moreDataFlag = !end_of_slice_flag
        } else
            moreDataFlag = 1
    }
    return moreDataFlag
}
```

Coding Tree Syntax for Split and MPM Flags

| Descriptor |
|---|

```
coding_tree_split_and_mpm_flags( x0, y0, log2CUSize ) {
    if( x0 + ( 1 << log2CUSize ) <= PicWidthInSamples_L &&
        y0 + ( 1 << log2CUSize ) <= PicHeightInSamples_L &&
        cuAddress( x0, y0 ) >= SliceAddress&&
        log2CUSize > Log2MinCUSize ) {
        split_coding_unit_flag[ x0 ][ y0 ]                 ae(v)
    }
    if( split_coding_unit_flag[ x0 ][ y0 ] ) {
        x1 = x0 + ( ( 1 << log2CUSize ) >> 1 )
        y1 = y0 + ( ( 1 << log2CUSize ) >> 1 )
        if( cuAddress( x1, y0 ) > SliceAddress )
            coding_tree_split_and_mpm_flags
( x0, y0, log2CUSize − 1 )
        if( cuAddress( x0, y1 ) >SliceAddress &&
            x1 < PicWidthInSamples_L )
            coding_tree_split_and_mpm_flags
( x1, y0, log2CUSize − 1 )
        if( cuAddress( x1, y1 ) > SliceAddress &&
            y1 < PicHeightInSamples_L )
            coding_tree_split_and_mpm_flags
( x0, y1, log2CUSize − 1 )
        if(x1 < PicWidthInSamplesL&& y1 <
PicHeightInSamples_L )
            coding_tree_split_and_mpm_flags
( x1, y1, log2CUSize − 1 )
    } else {
        coding_unit_part_mode_and_mpm_flag
( x0, y0, log2CUSize )
    }
}
```

Coding Tree Syntax for Luma Intra Mode

| Descriptor |
|---|

```
coding_tree_luma_intra_mode( x0, y0, log2CUSize ) {
    if( split_coding_unit_flag[ x0 ][ y0 ] ) {
        x1 = x0 + ( ( 1 << log2CUSize ) >> 1 )
        y1 = y0 + ( ( 1 << log2CUSize ) >> 1 )
        if( cuAddress( x1, y0 ) > SliceAddress )
            coding_tree_luma_intra_mode( x0, y0, log2CUSize −
1 )
        if( cuAddress( x0, y1 ) >SliceAddress &&
            x1 < PicWidthInSamples_L )
            coding_tree_luma_intra_mode
( x1, y0, log2CUSize − 1 )
        if( cuAddress( x1, y1 ) > SliceAddress &&
            y1 < PicHeightInSamples_L )
            coding_tree_luma_intra_mode
( x0, y1, log2CUSize − 1 )
        if(x1 < PicWidthInSamplesL&& y1 <
PicHeightInSamples_L )
            coding_tree_luma_intra_mode
( x1, y1, log2CUSize − 1 )
    } else {
        coding_unit_luma_intra_mode( x0, y0, log2CUSize )
    }
}
```

Coding Unit Syntax

| | Descriptor |
|---|---|
| coding_unit( x0, y0, log2CUSize ) { | |
|   if( slice_type != I ) | |
|     skip_flag[ x0 ][ y0 ] | ae(v) |
|   if( skip_flag[ x0 ][ y0 ] ) | |
|     prediction_unit( x0, y0 , log2CUSize ) | |
|   else { | |
|     if (slice_type != I || SliceGranularity != 0) { | |
|       pred_type | ae(v) |
|     } | |
|     x1 = x0 + ( ( 1 << log2CUSize ) >> 1 ) | |
|     y1 = y0 + ( ( 1 << log2CUSize ) >> 1 ) | |
|     x2 = x1 − ( ( 1 << log2CUSize ) >> 2 ) | |
|     y2 = y1 − ( ( 1 << log2CUSize ) >> 2 ) | |
|     x3 = x1 + ( ( 1 << log2CUSize ) >> 2 ) | |
|     y3 = y1 + ( ( 1 << log2CUSize ) >> 2 ) | |
|     if( PartMode == PART_2Nx2N ) { | |
|       prediction_unit( x0, y0 , log2CUSize ) | |
|     } else if( PartMode == PART_2NxN ) { | |
|       prediction_unit( x0, y0 , log2CUSize ) | |
|       prediction_unit( x0, y1 , log2CUSize ) | |
|     } else if( PartMode == PART_Nx2N ) { | |
|       prediction_unit( x0, y0 , log2CUSize ) | |
|       prediction_unit( x1, y0 , log2CUSize ) | |
|     } else if( PartMode == PART_2NxnU ) { | |
|       prediction_unit( x0, y0 , log2CUSize ) | |
|       prediction_unit( x0, y2 , log2CUSize ) | |
|     } else if( PartMode == PART_2NxnD ) { | |
|       prediction_unit( x0, y0 , log2CUSize ) | |
|       prediction_unit( x0, y3 , log2CUSize ) | |
|     } else if( PartMode == PART_nLx2N ) { | |
|       prediction_unit( x0, y0 , log2CUSize ) | |
|       prediction_unit( x2, y0 , log2CUSize ) | |
|     } else if( PartMode == PART_nRx2N ) { | |
|       prediction_unit( x0, y0 , log2CUSize ) | |
|       prediction_unit( x3, y0 , log2CUSize ) | |
|     } else } /* PART_NxN */ | |
|       prediction_unit( x0, y0 , log2CUSize ) | |
|       prediction_unit( x1, y0 , log2CUSize ) | |
|       prediction_unit( x0, y1 , log2CUSize ) | |
|       prediction_unit( x1, y1 , log2CUSize ) | |
|     } | |
|     if( !pcm_flag ) { | |
|       transform_tree( x0, y0, log2CUSize, log2CUSize, 0, 0 ) | |
|     transform_coeff( x0, y0, log2CUSize, log2CUSize, 0, 0 ) | |
|     transform_coeff( x0, y0, log2CUSize, log2CUSize, 0, 1 ) | |
|     transform_coeff( x0, y0, log2CUSize, log2CUSize, 0, 2 ) | |
|     } | |
|   } | |
| } | |

Coding Unit Syntax for Partitioning Mode and MPM Flag

| | Descriptor |
|---|---|
| coding_unit_part_mode_and_mpm_flag | |
| ( x0, y0, log2CUSize ) { | |
|   if (log2CUSize == Log2MinCUSize) { | |
|     pred_type | ae(v) |
|   } | |
|   x1 = x0 + ( ( 1 << log2CUSize ) >> 1 ) | |
|   y1 = y0 + ( ( 1 << log2CUSize ) >> 1 ) | |
|   x2 = x1 − ( ( 1 << log2CUSize ) >> 2 ) | |
|   y2 = y1 − ( ( 1 << log2CUSize ) >> 2 ) | |
|   x3 = x1 + ( ( 1 << log2CUSize ) >> 2 ) | |
|   y3 = y1 + ( ( 1 << log2CUSize ) >> 2 ) | |
|   if( PartMode == PART_2Nx2N ) { | |
|     prediction_unit_mpm_flag( x0, y0 , log2CUSize ) | |
|   }else { /* PART_NxN */ | |
|     prediction_unit_mpm_flag( x0, y0 , log2CUSize ) | |
|     prediction_unit_mpm_flag( x1, y0 , log2CUSize ) | |
|     prediction_unit_mpm_flag( x0, y1 , log2CUSize ) | |
|     prediction_unit_mpm_flag( x1, y1 , log2CUSize ) | |
|   } | |
| } | |

Coding Unit Syntax for Luma Intra Mode

| | Descriptor |
|---|---|
| coding_unit_luma_intra_mode( x0, y0, log2CUSize ) { | |
|   x1 = x0 + ( ( 1 << log2CUSize ) >> 1 ) | |
|   y1 = y0 + ( ( 1 << log2CUSize ) >> 1 ) | |
|   x2 = x1 − ( ( 1 << log2CUSize ) >> 2 ) | |
|   y2 = y1 − ( ( 1 << log2CUSize ) >> 2 ) | |
|   x3 = x1 + ( ( 1 << log2CUSize ) >> 2 ) | |
|   y3 = y1 + ( ( 1 << log2CUSize ) >> 2 ) | |
|   if( PartMode == PART_2Nx2N ) { | |
|     prediction_unit_luma_intra_mode( x0, y0 , log2CUSize ) | |
|   } else { /* PART_NxN */ | |
|     prediction_unit_luma_intra_mode( x0, y0 , log2CUSize ) | |
|     prediction_unit_luma_intra_mode( x1, y0 , log2CUSize ) | |
|     prediction_unit_luma_intra_mode( x0, y1 , log2CUSize ) | |
|     prediction_unit_luma_intra_mode( x1, y1 , log2CUSize ) | |
|   } | |
| } | |

Prediction Unit Syntax

| | Descriptor |
|---|---|
| prediction_unit( x0, y0, log2CUSize ) { | |
|   if( skip_flag[ x0 ][ y0 ] ) { | |
|     if( MaxNumMergeCand > 1 ) | |
|       merge_idx[ x0 ][ y0 ] | ae(v) |
|   } else if( PredMode == MODE_INTRA ) { | |
|     if (SliceGranularity == 0) { | |
|       if( !pcm_flag ) { | |
|         intra_chroma_pred_mode[ x0 ][ y0 ] | ae(v) |
|         SignaledAsChromaDC = | |
|         ( chroma_pred_from_luma_enabled_flag ? | |
|           intra_chroma_pred_mode[ x0 ][ y0 ] == 3 : | |
|           intra_chroma_pred_mode[ x0 ][ y0 ] == 2 ) | |
|       } | |
|     } else { | |
|       if( PartMode == PART_2Nx2N && | |
|       log2CUSize >= Log2MinIPCMCUSize ) | |
|       pcm_flag | ae(v) |
|       if( pcm_flag ) { | |
|         while ( !byte_aligned( ) ) | |

|  | Descriptor |
|---|---|
|         pcm_alignment_zero_bit | u(v) |
|         for( i = 0; i < 1 << ( log2CUSize << 1 ); i++ ) | |
|           pcm_sample_luma[ i ] | u(v) |
|         for( i = 0; i < ( 1 << ( log2CUSize << 1 ) ) >> 1; i++ ) | |
|           pcm_sample_chroma[ i ] | u(v) |
|     } else { | |
|       prev_intra_luma_pred_flag[ x0 ][ y0 ] | ae(v) |
|       if( prev_intra_luma_pred_flag[ x0 ][ y0 ] ) | |
|         mpm_idx[ x0 ][ y0 ] | ae(v) |
|       else | |
|         rem_intra_luma_pred_mode[ x0 ][ y0 ] | ae(v) |
|       intra_chroma_pred_mode[ x0 ][ y0 ] | ae(v) |
|       SignaledAsChromaDC = | |
|         ( chroma_pred_from_luma_enabled_flag ? | |
|           intra_chroma_pred_mode[ x0 ][ y0 ] == 3 : | |
|           intra_chroma_pred_mode[ x0 ][ y0 ] == 2 ) | |
|     } | |
|   } | |
| } else { /* MODE_INTER */ | |
|   merge_flag[ x0 ][ y0 ] | ae(v) |
|   if( merge_flag[ x0 ][ y0 ] ) { | |
|     if( MaxNumMergeCand > 1 ) | |
|       merge_idx[ x0 ][ y0 ] | ae(v) |
|   } else { | |
|     if( slice_type == B ) | |
|       inter_pred_flag[ x0 ][ y0 ] | ae(v) |
|     if( inter_pred_flag[ x0 ][ y0 ] == Pred_LC ) { | |
|       if( num_ref_idx_lc_active_minus1 > 0 ) | |
|         ref_idx_lc[ x0 ][ y0 ] | ae(v) |
|       mvd_coding(mvd_lc[ x0 ][ y0 ][ 0 ], | |
|         mvd_lc[ x0 ][ y0 ][ 1 ]) | |
|       mvp_idx_lc[ x0 ][ y0 ] | ae(v) |
|     } | |
|     else { /* Pred_L0 or Pred_BI */ | |
|       if( num_ref_idx_l0_active_minus1 > 0 ) | |
|         ref_idx_l0[ x0 ][ y0 ] | ae(v) |
|       mvd_coding(mvd_l0[ x0 ][ y0 ][ 0 ], | |
|         mvd_l0[ x0 ][ y0 ][ 1 ]) | |
|       mvp_idx_l0[ x0 ][ y0 ] | ae(v) |
|       } | |
|       if( inter_pred_flag[ x0 ][ y0 ] == Pred_BI ) { | |
|         if( num_ref_idx_l1_active_minus1 > 0 ) | |
|           ref_idx_l1[ x0 ][ y0 ] | ae(v) |
|         mvd_coding(mvd_l1[ x0 ][ y0 ][ 0 ], | |
|           mvd_l1[ x0 ][ y0 ][ 1 ]) | |
|         mvp_idx_l1[ x0 ][ y0 ] | ae(v) |
|       } | |
|     } | |
|   } | |
| } | |

Prediction Unit Syntax for MPM Flag

|  | Descriptor |
|---|---|
| prediction_unit_mpm_flag( x0, y0, log2CUSize ) { | |
|   if( PredMode == MODE_INTRA ) { | |
|     if( PartMode == PART_2Nx2N && | |
|       log2CUSize >= Log2MinIPCMCUSize ) | |
|       pcm_flag | ae(v) |
|     if( pcm_flag ) { | |
|       while ( !byte_aligned( ) ) | |
|         pcm_alignment_zero_bit | u(v) |
|       for( i = 0; i < 1 << ( log2CUSize << 1 ); i++ ) | |
|         pcm_sample_luma[ i ] | u(v) |
|       for( i = 0; i < ( 1 << ( log2CUSize << 1 ) ) >> 1; i++ ) | |
|         pcm_sample_chroma[ i ] | u(v) |
|     } else { | |
|       prev_intra_luma_pred_flag[ x0 ][ y0 ] | ae(v) |
|     } | |
|   } | |
| } | |

Prediction Unit Syntax for Luma Intra Mode

| | Descriptor |
|---|---|
| prediction_unit_luma_intra_mode( x0, y0, log2CUSize ) { | |
|   if( PredMode = = MODE_INTRA ) { | |
|     if( !pcm_flag[ x0 ][ y0 ] ) { | |
|       if( prev_intra_luma_pred_flag[ x0 ][ y0 ] ) | |

-continued

| | Descriptor |
|---|---|
|         mpm_idx[ x0 ][ y0 ] | ae(v) |
|       else | |
|         rem_intra_luma_pred_mode[ x0 ][ y0 ] | ae(v) |
|     } | |
| } | |

The following coding tree syntax illustrates the assignment of syntax elements to data blocks according to three categories labelled 1, 2 and 3.

Coding Tree Syntax

| | Category | Descriptor |
|---|---|---|
| coding_tree( x0, y0, log2CUSize, cuDepth ) { | | |
|   if( x0 + ( 1 << log2CUSize ) <= PicWidthInSamples$_L$&& | | |
|     y0 + ( 1 << log2CUSize ) <= PicHeightInSamples$_L$&& | | |
|     cuAddress( x0, y0 ) >= SliceAddress && | | |
|     log2CUSize > Log2MinCUSize ) { | | |
|       split_coding_unit_flag[ x0 ][ y0 ] | 1 | ae(v) |
|   } | | |
|   if( adaptive_loop_filter_flag && alf_cu_control_flag ) { | | |
|     if( cuDepth <= alf_cu_control_max_depth ) | | |
|       if( cuDepth == alf_cu_control_max_depth || | | |
|         split_coding_unit_flag[ x0 ][ y0 ] == 0 ) | | |
|         AlfCuFlagIdx++ | | |
|   } | | |
|   if( cu_qp_delta_enabled_flag && | | |
|     log2CUSize >= log2MinCUDQPSize ) | | |
|     IsCuQpDeltaCoded = 0 | | |
|   if( split_coding_unit_flag[ x0 ][ y0 ] ) { | | |
|     x1 = x0 + ( ( 1 << log2CUSize ) >> 1 ) | | |
|     y1 = y0 + ( ( 1 << log2CUSize ) >> 1 ) | | |
|     if( cuAddress( x1, y0 ) > SliceAddress ) | | |
|       moreDataFlag = coding_tree( x0, y0, log2CUSize − 1, cuDepth + 1 ) | | |
|     if( cuAddress( x0, y1 ) > SliceAddress && moreDataFlag && | | |
|       x1 < PicWidthInSamples$_L$ ) | | |
|       moreDataFlag = coding_tree( x1, y0, log2CUSize − 1, cuDepth + 1 ) | | |
|     if( cuAddress( x1, y1 ) > SliceAddress && moreDataFlag && | | |
|       y1 < PicHeightInSamples$_L$ ) | | |
|       moreDataFlag = coding_tree( x0, y1, log2CUSize − 1, cuDepth + 1 ) | | |
|     if( moreDataFlag && | | |
|       x1 < PicWidthInSamples$_L$&& y1 < PicHeightInSamples$_L$ ) | | |
|       moreDataFlag = coding_tree( x1, y1, log2CUSize − 1, cuDepth + 1 ) | | |
|   } else { | | |
|     if(adaptive_loop_filter_flag && alf_cu_control_flag ) | | |
|       AlfCuFlag[ x0 ][ y0 ] = alf_cu_flag[ AlfCuFlagIdx ] | | |
|     coding_unit( x0, y0, log2CUSize ) | | |
|     if( granularity_block_boundary( x0, y0, log2CUSize ) ) { | | |
|       end_of_slice_flag | 3 | ae(v) |
|       moreDataFlag = !end_of_slice_flag | | |
|     } else | | |
|       moreDataFlag = 1 | | |
|   } | | |
|   return moreDataFlag | | |
| } | | |

Coding Unit Syntax

| | Category | Descriptor |
|---|---|---|
| coding_unit( x0, y0, log2CUSize ) { | | |
|   if( slice_type != I ) | | |
|     skip_flag[ x0 ][ y0 ] | n/a | ae(v) |
|   if( skip_flag[ x0 ][ y0 ] ) | | |
|     prediction_unit( x0, y0 , log2CUSize ) | | |
|   else if( slice_type != I \|\| log2CUSize = = Log2MinCUSize ) { | | |
|     pred_type | 1 | ae(v) |
|     x1 = x0 + ( ( 1 << log2CUSize ) >> 1 ) | | |
|     y1 = y0 + ( ( 1 << log2CUSize ) >> 1 ) | | |
|     x2 = x1 − ( ( 1 << log2CUSize ) >> 2 ) | | |
|     y2 = y1 − ( ( 1 << log2CUSize ) >> 2 ) | | |
|     x3 = x1 + ( ( 1 << log2CUSize ) >> 2 ) | | |
|     y3 = y1 + ( ( 1 << log2CUSize ) >> 2 ) | | |
|     if( PartMode == PART_2Nx2N ) { | | |
|       prediction_unit( x0, y0 , log2CUSize ) | | |
|     } else if( PartMode == PART_2NxN ) { | | |
|       prediction_unit( x0, y0 , log2CUSize ) | | |
|       prediction_unit( x0, y1 , log2CUSize ) | | |
|     } else if( PartMode == PART_Nx2N ) { | | |
|       prediction_unit( x0, y0 , log2CUSize ) | | |
|       prediction_unit( x1, y0 , log2CUSize ) | | |
|     } else if( PartMode == PART_2NxnU ) { | | |
|       prediction_unit( x0, y0 , log2CUSize ) | | |
|       prediction_unit( x0, y2 , log2CUSize ) | | |
|     } else if( PartMode == PART_2NxnD ) { | | |
|       prediction_unit( x0, y0 , log2CUSize ) | | |
|       prediction_unit( x0, y3 , log2CUSize ) | | |
|     } else if( PartMod == PART_nLx2N ) { | | |
|       prediction_unit( x0, y0 , log2CUSize ) | | |
|       prediction_unit( x2, y0 , log2CUSize ) | | |
|     } else if( PartMode == PART_nRx2N ) { | | |
|       prediction_unit( x0, y0 , log2CUSize ) | | |
|       prediction_unit( x3, y0 , log2CUSize ) | | |
|     } else { /* PART_NxN */ | | |
|       prediction_unit( x0, y0 , log2CUSize ) | | |
|       prediction_unit( x1, y0 , log2CUSize ) | | |
|       prediction_unit( x0, y1 , log2CUSize ) | | |
|       prediction_unit( x1, y1 , log2CUSize ) | | |
|     } | | |
|     if( !pcm_flag ) { | | |
|       transform_tree( x0, y0, log2CUSize, log2CUSize, 0, 0 ) | | |
|     transform_coeff( x0, y0, log2CUSize, log2CUSize, 0, 0 ) | | |
|     transform_coeff( x0, y0, log2CUSize, log2CUSize, 0, 1 ) | | |
|     transform_coeff( x0, y0, log2CUSize, log2CUSize, 0, 2 ) | | |
|     } | | |
|   } | | |
| } | | |

Prediction Unit Syntax

| | Category | Descriptor |
|---|---|---|
| prediction_unit( x0, y0, log2CUSize) { | | |
|   if( skip_flag[ x0 ][ y0 ] ) { | | |
|     if( MaxNumMergeCand > 1 ) | | |
|       merge_idx[ x0 ][ y0 ] | n/a | ae(v) |
|   } else if( PredMode = = MODE_INTRA ) { | | |
|     if( PartMode == PART_2Nx2N && | | |
|       log2CUSize >= Log2MinIPCMCUSize ) | | |
|       pcm_flag | n/a | ae(v) |
|     if( pcm_flag ) { | | |
|       while ( !byte_aligned( ) ) | | |
|         pcm_alignment_zero_bit | n/a | u(v) |
|       for( i = 0; i < 1 << ( log2CUSize << 1 ); i++ ) | | |
|         pcm_sample_luma[ i ] | n/a | u(v) |
|       for( i = 0; i < ( 1 << ( log2CUSize << 1 ) ) >> 1; i++ ) | | |
|         pcm_sample_chroma[ i ] | n/a | u(v) |
|     } else { | | |
|       prev_intra_luma_pred_flag[ x0 ][ y0 ] | 1 (2 if EP) | ae(v) |
|       if( prev_intra_luma_pred_flag[ x0 ][ y0 ] ) | | |
|         mpm_idx[ x0 ][ y0 ] | 2 | ae(v) |
|       else | | |
|         rem_intra_luma_pred_mode[ x0 ][ y0 ] | 2 | ae(v) |

| | Category | Descriptor |
|---|---|---|
|     intra_chroma_pred_mode[ x0 ][ y0 ]<br>    SignaledAsChromaDC =<br>      ( chroma_pred_from_luma_enabled_flag ?<br>        intra_chroma_pred_mode[ x0 ][ y0 ] == 3 :<br>        intra_chroma_pred_mode[ x0 ][ y0 ] == 2 )<br>  }<br>} else { /* MODE_INTER */<br>  merge_flag[ x0][ y0 ] | 3<br><br><br><br><br><br><br>n/a | ae(v)<br><br><br><br><br><br><br>ae(v) |
|   if( merge_flag[ x0 ][ y0 ] ) {<br>    if( MaxNumMergeCand > 1 )<br>      merge_idx[ x0 ][ y0 ]<br>  } else {<br>    if( slice_type == B )<br>      inter_pred_flag[ x0 ][ y0 ]<br>    if( inter_pred_flag[ x0 ][ y0 ] == Pred_LC ) {<br>      if( num_ref_idx_lc_active_minus1 > 0 )<br>        ref_idx_lc[ x0 ][ y0 ]<br>      mvd_coding(mvd_lc[ x0 ][ y0 ][ 0 ],<br>        mvd_lc[ x0 ][ y0 ][ 1 ])<br>      mvp_idx_lc[ x0 ][ y0 ]<br>    }<br>    else { /* Pred_L0 or Pred_BI */<br>      if( num_ref_idx_l0_active_minus1 > 0 )<br>        ref_idx_l0[ x0 ][ y0 ]<br>      mvd_coding(mvd_l0[ x0 ][ y0 ][ 0 ],<br>        mvd_l0[ x0 ][ y0 ][ 1 ])<br>      mvp_idx_l0[ x0 ][ y0 ]<br>    }<br>    if( inter_pred_flag[ x0 ][ y0 ] == Pred_BI ) {<br>      if( num_ref_idx_l1_active_minus1 > 0 )<br>        ref_idx_l1[ x0 ][ y0 ]<br>      mvd_coding(mvd_l1[ x0 ][ y0 ][ 0 ],<br>        mvd_l1[ x0 ][ y0 ][ 1 ])<br>      mvp_idx_l1[ x0 ][ y0 ]<br>    }<br>  }<br>}<br>} | <br><br>n/a<br><br><br>n/a<br><br><br>n/a<br><br><br>n/a<br><br><br><br>n/a<br><br><br>n/a<br><br><br><br>n/a<br><br><br>n/a | <br><br>ae(v)<br><br><br>ae(v)<br><br><br>ae(v)<br><br><br>ae(v)<br><br><br><br>ae(v)<br><br><br>ae(v)<br><br><br><br>ae(v)<br><br><br>ae(v) |

(End Appendix A)

The invention claimed is:

1. A method of decoding image data from a bit stream, the method comprising:

determining a division state of dividing a unit having a predetermined size into coding units and a partition mode used for dividing a coding unit into a plurality of prediction units, the division state being indicated by a split-flag, the partition mode being determinable using a prediction mode value indicating a prediction mode used for the coding unit, wherein, in a case where the partition mode for the coding unit is N×N, the method further comprises:

decoding a plurality of pieces of first information which are arithmetically encoded in a first data block in the bitstream, the first data block not including bypass encoded data, each of the pieces of first information being for a different one of the plurality of prediction units of a coding unit using intra-prediction, the plurality of prediction units being associated with the coding unit, each of the plurality of pieces of first information indicating whether any of a plurality of specific intra-prediction modes for the associated prediction unit is to be used;

decoding a plurality of pieces of second information which are consecutively bypass encoded in a second data block located after the first data block in the bitstream, after decoding of the plurality of pieces of first information, the second data block not including arithmetically encoded data, each of the plurality of pieces of second information being a most probable mode index or a remaining intra-prediction mode, and each of the pieces of second information being for the different one of the plurality of prediction units of the coding unit;

determining intra-prediction modes for the plurality of prediction units of the coding unit in accordance with a corresponding piece of first information among the plurality of pieces of first information and a corresponding piece of second information among the plurality of pieces of second information, wherein each of the intra-prediction modes is determined for a different one of the plurality of prediction units of the coding unit; and decoding the plurality of prediction units by using the determined intra-prediction modes.

2. The method according to claim 1, wherein the remaining intra-prediction mode is an intra-prediction mode other than the plurality of specific intra-prediction modes.

3. The method according to claim 1, wherein the most probable mode index designates one of the plurality of specific intra-prediction modes.

4. The method according to claim 1, wherein the first information is a flag.

5. The method according to claim 1, wherein the plurality of specific intra-prediction modes are most probable modes for the prediction unit.

6. A method of encoding image data into a bitstream comprising:

determining a division state of dividing a unit having a predetermined size into coding units and a partition mode used for dividing a coding unit into a plurality of prediction units, the division state being indicated by a split-flag, the partition mode being determinable using a prediction mode value indicating a prediction mode used for the coding unit, wherein, in a case where the partition mode for the coding unit is N×N, the method further comprises:

determining intra-prediction modes for the plurality of prediction units of a coding unit using intra-prediction, each of the intra-prediction modes being determined for a different one of the plurality of prediction units;

encoding data corresponding to the plurality of prediction units, by using the determined intra-prediction modes, into the bitstream;

arithmetically encoding a plurality of pieces of first information into a first data block in the bitstream, the first data block not including bypass encoded data, each of the pieces of first information being for a different one of the plurality of prediction units of the coding unit, the plurality of prediction units being associated with the coding unit, each of the plurality of pieces of first information indicating whether any of a plurality of specific intra-prediction modes for the associated prediction unit is to be used; and bypass encoding a plurality of pieces of second information into a second data block located after the first data block in the bitstream, after encoding of the plurality of pieces of first information, so that the plurality of pieces of second information are consecutive in the second data block, the second data block not including arithmetically encoded data, each of the plurality of pieces of second information being a most probable mode index or a remaining intra-prediction mode, and each of the pieces of second information being for the different one of the plurality of prediction units of the coding unit.

7. The method according to claim 6, wherein the remaining intra-prediction mode is an intra-prediction mode other than the plurality of specific intra-prediction modes.

8. The method according to claim 6, wherein the most probable mode index designates one of the plurality of specific intra-prediction modes.

9. The method according to claim 6, wherein the first information is a flag.

10. The method according to claim 6, wherein the plurality of specific intra-prediction modes are most probable modes for the prediction unit.

11. An image decoding apparatus for decoding image data from a bitstream, the apparatus comprising one or more processors executing instructions that, when executed by the one or more processors, cause the apparatus to function as:

a determining unit configured to determine a division state of dividing a unit having a predetermined size into coding units and a partition mode used for dividing a coding unit into a plurality of prediction units, the division state being indicated by a split-flag, the partition mode being determinable using a prediction mode value indicating a prediction mode used for the coding unit, wherein, in a case where the partition mode for the coding unit is N×N, the instructions further cause the apparatus to function as:

a decoding unit configured to decode a plurality of pieces of first information which are arithmetically encoded in a first data block in the bitstream, the first data block not including bypass encoded data, each of the pieces of first information being for a different one of the plurality of prediction units of a coding unit using intra-prediction, the plurality of prediction units being associated with the coding unit, each of the plurality of pieces of first information indicating whether any of a plurality of specific intra-prediction modes for the associated prediction unit is to be used, wherein the decoding unit is configured to decode a plurality of pieces of second information which are consecutively bypass encoded in a second data block located after the first data block in the bitstream, after decoding of the plurality of pieces of first information, the second data block not including arithmetically encoded data, each of the plurality of pieces of second information being a most probable mode index or a remaining intra-prediction mode, and each of the pieces of second information being for the different one of the plurality of prediction units of the coding unit; and a determining unit configured to determine intra-prediction modes for the plurality of prediction units of the coding unit, in accordance with a corresponding piece of first information among the plurality of pieces of first information and a corresponding piece of second information among the plurality of pieces of second information, wherein each of the intra-prediction modes is determined for a different one of the plurality of prediction units of the coding unit, wherein the decoding unit is configured to decode the plurality of prediction units by using the determined intra-prediction modes.

12. An image encoding apparatus encoding image data into a bitstream, the apparatus comprising one or more processors executing instructions that, when executed by the one or more processors, cause the apparatus to function as:

a determining unit configured to determine a division state of dividing a unit having a predetermined size into coding units and a partition mode used for dividing a coding unit into a plurality of prediction units, the division state being indicated by a split-flag, the partition mode being determinable using a prediction mode value indicating a prediction mode used for the coding unit, wherein, in a case where the partition mode for the coding unit is N×N, the instructions further cause the apparatus to function as:

a determining unit configured to determine intra-prediction modes for the plurality of prediction units of a coding unit using intra-prediction, each of the intra-prediction modes being determined for a different one of the plurality of prediction units; and an encoding unit configured to encode data corresponding to the plurality of prediction units, by using the determined intra-prediction modes, into the bitstream, wherein the encoding unit is configured to arithmetically encode a plurality of pieces of first information into a first data block in the bitstream, the first data block not including bypass encoded data, each of the pieces of first information being for a different one of the plurality of prediction units of the coding unit, the plurality of prediction units being associated with the coding unit, each of the plurality of pieces of first information indicating whether any of a plurality of specific intra-prediction modes for the associated prediction unit is to be used, wherein the encoding unit is configured to bypass encode a plurality of pieces of second information into a second data block located after the first data block, after encoding of the plurality of pieces of first information, so that the plurality of pieces of second information are consecutive in the second data block, the second data block not including arithmetically encoded data, each of the plurality of pieces of second information being a most probable mode index or a remaining intra-prediction mode, and each of the pieces of second information being for the different one of the plurality of prediction units of the coding unit.

13. A non-transitory computer-readable storage medium storing a program that causes a computer to execute a method of decoding image data from a bitstream, the method comprising:

determining a division state of dividing a unit having a predetermined size into coding units and a partition mode used for dividing a coding unit into a plurality of prediction units, the division state being indicated by a split-flag, the partition mode being determinable using a prediction mode value indicating a prediction mode used for the coding unit, wherein, in a case where the partition mode for the coding unit is N×N, the method further comprises:

decoding a plurality of pieces of first information which are arithmetically encoded in a first data block in the bitstream, the first data block not including bypass encoded data, each of the pieces of first information being for a different one of the plurality of prediction units of a coding unit using intra-prediction, the plurality of prediction units being associated with the coding unit, each of the plurality of pieces of first information indicating whether any of a plurality of specific intra-prediction modes for the associated prediction unit is to be used;

decoding a plurality of pieces of second information which are consecutively bypass encoded in a second data block located after the first data block in the bitstream, after decoding of the plurality of pieces of first information, the second data block not including arithmetically encoded data, each of the plurality of pieces of second information being a most probable mode index or a remaining intra-prediction mode, and each of the pieces of second information being for the different one of the plurality of prediction units of the coding unit;

determining intra-prediction modes for the plurality of prediction units of the coding unit, in accordance with a corresponding piece of first information among the plurality of pieces of first information and a corresponding piece of second information among the plurality of pieces of second information, wherein each of the intra-prediction modes is determined for a different one of the plurality of prediction units of the coding unit; and decoding the plurality of prediction units by using the determined intra-prediction modes.

14. A non-transitory computer-readable storage medium storing a program that causes a computer to execute a method of encoding image data into a bitstream comprising:

determining a division state of dividing a unit having a predetermined size into coding units and a partition mode used for dividing a coding unit into a plurality of prediction units, the division state being indicated by a split-flag, the partition mode being determinable using a prediction mode value indicating a prediction mode used for the coding unit, wherein, in a case where the partition mode for the coding unit is N×N, the method further comprises:

determining intra-prediction modes for the plurality of prediction units of a coding unit using intra-prediction, each of the intra-prediction modes being determined for a different one of the plurality of prediction units;

encoding data corresponding to the plurality of prediction units, by using the determined intra-prediction modes, into the bitstream;

arithmetically encoding a plurality of pieces of first information into a first data block in the bitstream, the first data block not including bypass encoded data, each of the pieces of first information being for a different one of the plurality of prediction units of the coding unit, the plurality of prediction units being associated with the coding unit, each of the plurality of pieces of first information indicating whether any of a plurality of specific intra-prediction modes for the associated prediction unit is to be used; and bypass encoding a plurality of pieces of second information into a second data block located after the first data block in the bitstream, after encoding of the plurality of pieces of first information, so that the plurality of pieces of second information are consecutive in the second data block, the second data block not including arithmetically encoded data, each of the plurality of pieces of second information being a most probable mode index or a remaining intra-prediction mode, and each of the pieces of second information being for the different one of the plurality of prediction units of the coding unit.

* * * * *